US011051234B2

United States Patent
Sun et al.

(10) Patent No.: US 11,051,234 B2
(45) Date of Patent: Jun. 29, 2021

(54) CONTROL SEARCH SPACE OVERLAP INDICATION

(71) Applicant: QUALCOMM Incorporated, San Diego, CA (US)

(72) Inventors: Jing Sun, San Diego, CA (US); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/681,554

(22) Filed: Nov. 12, 2019

(65) Prior Publication Data

US 2020/0154341 A1 May 14, 2020

(30) Foreign Application Priority Data

Nov. 14, 2018 (IN) .............................. 201841042779

(51) Int. Cl.
*H04W 48/10* (2009.01)
*H04W 72/14* (2009.01)
*H04L 5/00* (2006.01)

(52) U.S. Cl.
CPC ........... *H04W 48/10* (2013.01); *H04W 72/14* (2013.01)

(58) Field of Classification Search
None
See application file for complete search history.

(56) References Cited

U.S. PATENT DOCUMENTS

2019/0068348 A1* 2/2019 Nam .................... H04L 5/0053
2019/0274098 A1* 9/2019 Cheng .................. H04L 5/0091

OTHER PUBLICATIONS

CATT: "DL Physical Channel and Signal Design for NR-U Operations", 3GPP Draft, R1-1813279, NR-U DL, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051555295, 5 pages, Retrieved from the Internet: URL: http://www.3gpp.org/ftp/Meetings%5F3GPP% 5FSYNC/RAN1/Docs/R1%2D1813279%2Ezip. [retrieved on Nov. 11, 2018] p. 2, paragraph 2.1-p. 4, paragraph 2.1 figures 1-3.

(Continued)

*Primary Examiner* — Hong S Cho
(74) *Attorney, Agent, or Firm* — Liem T. Do

(57) ABSTRACT

A user equipment (UE) may receiving, from a base station, a synchronization signal block (SSB) of a set of quasi-collocated (QCL) SSBs, the SSB comprising an indication of a parameter indicating information associated with a plurality of downlink control channel locations corresponding to the set of QCL SSBs. The UE may determine, based at least in part on the parameter, the plurality of downlink control channel locations corresponding to the set of QCL SSBs. The UE may receive a downlink grant for a system information based at least in part on monitoring one or more downlink control channel locations of the plurality of downlink control channel locations. The UE may receive the system information based at least in part on the downlink grant. The UE may establish a connection with the base station based at least in part on the SSB and the received system information.

43 Claims, 18 Drawing Sheets

(56) References Cited

OTHER PUBLICATIONS

International Search Report and Written Opinion—PCT/US2019/061189—ISA/EPO—dated May 19, 2020.
Samsung: "Remaining Details on SS Burst Set Related Procedures", 3GPP Draft; R1-1715908-SS_Block_V2, 3rd Generation Partnership Project (3GPP), Mobile Competence Centre ; 650, Route Des Lucioles ; F-06921 Sophia-Antipolis Cedex ; France, vol. RAN WG1, No. Nagoya, Japan; Sep. 18, 2017-Sep. 21, 2017, Sep. 17, 2017 (Sep. 17, 2017), XP051339367, 9 Pages, Retrieved from the Internet: URL:http://www.3gpp.org/ftp/Meetings_3GPP_SYNC/RAN1/Docs/ [retrieved on Sep. 17, 2017], Section 2.2; p. 3-p. 5.
Vivo: "Discussion on ssb-Positions in Burst Mismatch in SIB1 and Serving Cell Config Common", 3GPP Draft, R1-1808214, Discussion on ssb-Positions in Burst Mismatch in SIB1 and Serving Cell Config Common, 3rd Generation Partnership Project (3GPP), Mobile Competence Centre, 650, Route Des Lucioles, vol. RAN WG1, No. Gothenburg, Sweden, Aug. 20, 2018-Aug. 24, 2018, Aug. 10, 2018 (Aug. 10, 2018), XP051515599, 5 pages, Retrieved from the Internet: URL: http://www.3gpp.org/ftp/tsg%5Fran/WG1%5FRL1/TSGR1%5F94/Docs/R1%2D1808214%2Ezip. [retrieved on Aug. 10, 2018] p. 1, paragraph 1-p. 4, paragraph 2.3.
Xiaomi Communications: "Optimization on the SSB Bitmap in Group Indication in RMSI", 3GPP Draft, R1-1720601, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051370068, 3 pages, Retrieved from the Internet: URL: http://www.3gpp.org/ftp/tsg%5Fran/WG1%5FRL1/TSGR1%5F91/Docs/. [retrieved on Nov. 18, 2017] p. 1, paragraph 1-p. 2, paragraph 2.1 figure 1.
NTT Docomo et al., "Offline Summary for AI 7.3.1.2 Remaining Details on search Space", 3GPP TSG RAN WG1 Meeting #91, 3GPP Draft; R1-1721414, 3rd Generation Partnership Project (3GPP), Mobile Competence Centre; 650, Route Des Lucioles; F-06921 Sophia Antipolis Cedex; France vol. RAN WG1, No. Reno, USA; 20171127-20171201, Nov. 28, 2017 (Nov. 28, 2017), XP051363871, Retrieved from the Internet: URL: http://www.3gpp.org/ftp/Meetings%5F3GPP%5FSYNC/RAN1/Docs/ [retrieved on Nov. 28, 2017], p. 1, paragraph 1.1-p. 3, paragraph 1.1.
NTT Docomo, Inc: "Offline Summary for AI 7.3.1.2 Remaining Details on Search Space," 3GPPTSG RAN WG1 Meeting 91,3GPP Draft; R1-1721414, 3rd Generation Partnership Project (3GPP), Mobile Competence Centre; 650, Route Des Lucioles; F-06921 Sophia-Antipolis Cedex, France, vol. RAN WG1, No. Reno, USA; 20171127-20171201, Nov. 28, 2017 (Nov. 28, 2017), XP051363871, pp. 1-24, Retrieved from the Internet: URL:http://www.3gpp.org/ftp/Meetings_3GPP_SYNC/RAN1/Docs/[retrieved on Nov. 28, 2017], Section 1.2 and 1.4. 0.
Partial International Search Report—PCT/US2019/061189—ISA/EPO—dated Feb. 21, 2020.
QUALCOMM Incorporated: "Initial Access and Mobility Procedures for Nr-U", 3GPP TSG RAN WG1 Meeting #95, 3GPP Draft; R1-1813414, 7.2.2.4.2, 3rd Generation Partnership Project (3GPP), Mobile Competence Centre, 650, Route Des Lucioles; F-06921 Sophia-Antipolis Cedex, France, vol. Ran WG1, No. Spokane, USA; 20181112-20181116, Nov. 3, 2018 (Nov. 2, 2018), pp. 1-8, XP051479736, Retrieved from the Internet: URL: http://www.3gpp.org/ftp/tsg%5Fran/VVG1%5FRL1/TSGR1%5F95/Docs/R1%2D1813414%2Ezip [retrieved on Nov. 3, 2018], p. 1, paragraph 1-p. 2, paragraph, p. 2, paragraph 2.1.1 p. 3, paragraph 2.1.1.
QUALCOMM Incorporated: "Remaining System Information Delivery Consideration", 3GPP TSG RAN WG1 Meeting NR #90, 3GPP Draft; R1-1713376 Remaining System Information Delivery Consideration, 3RD Generation Partnership Project (3GPP), Mobile Competence Centre; 650, Route Des Lucioles ; F- 06921 Sophia-Antipolis Cedex, vol. RAN WG1, No. Prague. Czech Republic; 20170821 20170825, Aug. 20, 2017 (Aug. 20, 2017), pp. 1-8, XP051316181, Retrieved from the Internet: UR;: http://www.3gpp.org/ftp/Meetings_3GPP_SYNC/RAN1/Docs/ [retrieved on Aug. 20, 2017], p. 1. Paragraph 2 - p. 3, paragraph 3.2.
Samsung: "Remaining Minimum System Information Delivery", 3GPP TSG RAN WG1 Meeting #90, R1-1713556, Prague, Czechia, Aug. 21—25, 2017, (Aug. 20, 2017), XP051316356, URL: http://www.3gpp.org/ftp/Meetings_3GPP_SYNC/RAN1/Docs/ [retrieved on Aug. 20, 2017]pp. 1-5. p. 2, paragraph 3-p. 4, paragraph 3 figures 1, 2.

\* cited by examiner

CONTROL SEARCH SPACE OVERLAP INDICATION

CROSS REFERENCE

The present application for patent claims the benefit of India Provisional Patent Application No. 201841042779 by SUN, et al., entitled "CONTROL SEARCH SPACE OVERLAP INDICATION," filed Nov. 14, 2018, assigned to the assignee hereof, and expressly incorporated herein.

BACKGROUND

The following relates generally to wireless communications, and more specifically to control search space overlap indication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems typically support a variety of communication techniques to support wireless communications between a base station and the UE. For example, a base station may transmit a variety of synchronization signals (e.g., synchronization signal blocks (SSBs)) to support acquisition by UEs. Generally, the SSBs may carry or convey various parameters associated with the base station that the UE uses to align (in time, frequency, and the like) with the base station, at least to some degree, in order to establish a connection between the base station and the UE. Conventionally, a limited or defined number of SSBs are typically transmitted by the base station. In a millimeter wave (mmW) network, the base station may transmit the SSBs in beamformed transmissions in a sweeping manner around the coverage area of the base station.

Conventionally, the limited or defined number of SSBs available for transmission supported a one-to-one mapping between the SSBs and various control signal resources. For example, each SSB may have a corresponding set of control signal (e.g., physical downlink control channel (PDCCH)) resources associated with it, e.g., index number for the SSB may correspond to a particular PDCCH resource. However, conventional techniques do not support a configuration were additional SSBs may be used for transmission, e.g., may not provide a mechanism that supports an indication of PDCCH search space overlap. Accordingly, in the situation where additional SSBs are available for transmission, conventional wireless networks may not support mapping a plurality of SSBs to a particular control channel resource.

SUMMARY

The described techniques relate to improved methods, systems, devices, and apparatuses that support control search space overlap indication. Generally, the described techniques provide for various mechanisms that improve indicating overlapping control channel locations corresponding to a set of quasi-co-located (QCL) synchronization signal blocks (SSBs). For example, a base station may transmit a plurality of SSBs from a set of QCL SSBs. In some aspects, each of the SSBs within the plurality of SSBs carry or otherwise convey an indication of an offset between successive SSBs within the set of QCL SSBs. Broadly, the offset may refer to a parameter carried or conveyed in the SSB (e.g., a physical broadcast channel (PBCH) portion of the SSB) that allows or otherwise supports the control channel location overlapping for different SSBs. A user equipment (UE) may receive one of the SSBs transmitted from the base station and determine the indicated offset. Based on this offset, the UE may determine a plurality of downlink control channel locations (e.g., physical downlink control channel (PDCCH) locations) that correspond to the set of QCL SSBs. The UE may use the determined downlink control channel locations to receive a downlink grant for a system information signal (e.g., a remaining minimum system information (RMSI)), e.g., by monitoring the downlink control channel locations. The UE may receive the system information according to the downlink grant and use the information in the system information (e.g., RMSI) as well as the SSB to establish a connection with the base station.

In other aspects, the described techniques may support rate matching operations of the UE. For example, the system information (e.g., RMSI) may carry or convey a bitmap that indicates a subset of SSBs that are actually being transmitted from a set of SSBs, e.g., the bits within the bitmap may be set to "1" to indicate that an SSB is transmitted in that location, or vice versa. In some aspects, the system information may additionally carry or convey an indication of a maximum number of SSBs available for use that is greater than the total number of SSBs in the set of SSBs. For example, the bitmap may be configured as "10101010" to indicate that SSB positions 0, 2, 4, and 6 are actually being transmitted within a set of SSBs consisting of SSB positions (or indices) 0-7. The indication of the maximum number of SSBs may be set to the number of the maximum SSB position being used, e.g., 12, 16, 18, or some other number of maximum SSB positions that may be used. The UE may configure rate matching based, at least in some aspects, on the subset of SSBs indicated by the bitmap as well as the indicated maximum number of SSBs available for use. In some aspects, this may include the UE having a rule or otherwise repeating the pattern of actually transmitted SSBs (e.g., the subset of SSBs within the set of SSBs) and the punctured SSB positions within the set of SSBs for the used SSB positions, e.g., the UE may repeat the pattern "10101010" for the SSB positions 8 through the end of the maximum number of SSBs available for use. Accordingly, the UE may receive a data transmission (e.g., a physical downlink shared channel (PDSCH)) transmission using the configured rate matching.

A method of wireless communication at a UE is described. The method may include receiving, from a base station, a SSB of a set of QCL SSBs, the SSB including an indication of a parameter indicating information associated with a set of downlink control channel locations corresponding to the set of QCL SSBs, determining, based on the parameter, the set of downlink control channel locations corresponding to the set of QCL SSBs, receiving a downlink grant for a system information based on monitoring one or more downlink control channel locations of the set of downlink control channel locations, receiving the system information based on the downlink grant, and establishing a connection with the base station based on the SSB and the received system information.

An apparatus for wireless communication at a UE is described. The apparatus may include a processor, memory in electronic communication with the processor, and instructions stored in the memory. The instructions may be executable by the processor to cause the apparatus to receive, from a base station, a SSB of a set of QCL SSBs, the SSB including an indication of a parameter indicating information associated with a set of downlink control channel locations corresponding to the set of QCL SSBs, determine, based on the parameter, the set of downlink control channel locations corresponding to the set of QCL SSBs, receive a downlink grant for a system information based on monitoring one or more downlink control channel locations of the set of downlink control channel locations, receive the system information based on the downlink grant, and establish a connection with the base station based on the SSB and the received system information.

Another apparatus for wireless communication at a UE is described. The apparatus may include means for receiving, from a base station, a SSB of a set of QCL SSBs, the SSB including an indication of a parameter indicating information associated with a set of downlink control channel locations corresponding to the set of QCL SSBs, determining, based on the parameter, the set of downlink control channel locations corresponding to the set of QCL SSBs, receiving a downlink grant for a system information based on monitoring one or more downlink control channel locations of the set of downlink control channel locations, receiving the system information based on the downlink grant, and establishing a connection with the base station based on the SSB and the received system information.

A non-transitory computer-readable medium storing code for wireless communication at a UE is described. The code may include instructions executable by a processor to receive, from a base station, a SSB of a set of QCL SSBs, the SSB including an indication of a parameter indicating information associated with a set of downlink control channel locations corresponding to the set of QCL SSBs, determine, based on the parameter, the set of downlink control channel locations corresponding to the set of QCL SSBs, receive a downlink grant for a system information based on monitoring one or more downlink control channel locations of the set of downlink control channel locations, receive the system information based on the downlink grant, and establish a connection with the base station based on the SSB and the received system information.

In some examples of the method, apparatuses, and non-transitory computer-readable medium described herein, the parameter includes an indication of offset between successive SSBs within the set of QCL SSBs.

In some examples of the method, apparatuses, and non-transitory computer-readable medium described herein, receiving the SSB may include operations, features, means, or instructions for receiving a PBCH portion of the SSB, the PBCH portion of the SSB including the indication of the parameter.

In some examples of the method, apparatuses, and non-transitory computer-readable medium described herein, receiving the PBCH portion of the synchronization block may include operations, features, means, or instructions for performing soft combining across a set of SSBs.

In some examples of the method, apparatuses, and non-transitory computer-readable medium described herein, the indication of the parameter may be common across each SSB of the set of SSBs.

In some examples of the method, apparatuses, and non-transitory computer-readable medium described herein, the set of SSBs include at least one of the set of QCL SSBs, a set of different sets of QCL SSBs, each SSB associated with the base station, or a combination thereof.

Some examples of the method, apparatuses, and non-transitory computer-readable medium described herein may further include operations, features, means, or instructions for determining an index of each SSB of the set of QCL SSBs, and where determining the set of downlink control channel locations may be based on the determined index of each SSB of the set of QCL SSBs.

Some examples of the method, apparatuses, and non-transitory computer-readable medium described herein may further include operations, features, means, or instructions for determining the set of downlink control channel locations may be based on a frame in which the SSB may be received and the parameter indicated in the SSB.

In some examples of the method, apparatuses, and non-transitory computer-readable medium described herein, receiving the downlink grant may include operations, features, means, or instructions for monitoring each downlink control channel location of the set of downlink control channel locations.

In some examples of the method, apparatuses, and non-transitory computer-readable medium described herein, receiving the downlink grant may include operations, features, means, or instructions for determining that no downlink control information was detected during a first instance of the set of downlink control channel locations, and monitoring, based on the parameter, a second instance of the set of downlink control channel locations to detect the downlink grant.

In some examples of the method, apparatuses, and non-transitory computer-readable medium described herein, the downlink control channel locations of the set of downlink control channel locations include type 0 PDCCH common search spaces.

A method of wireless communication at a base station is described. The method may include transmitting a set of SSBs, the set of SSBs including a set of QCL SSBs, where each SSB of the set of SSBs includes an indication of a parameter indicating information associated with a set of downlink control channel locations corresponding to the set of QCL SSBs, transmitting, based on the parameter, a downlink grant for a system information over the set of downlink control channel locations corresponding to the set of QCL SSBs, transmitting the system information according to the grant, and establishing a connection with a UE based on the SSB and the system information.

An apparatus for wireless communication at a base station is described. The apparatus may include a processor, memory in electronic communication with the processor, and instructions stored in the memory. The instructions may be executable by the processor to cause the apparatus to transmit a set of SSBs, the set of SSBs including a set of QCL SSBs, where each SSB of the set of SSBs includes an indication of a parameter indicating information associated with a set of downlink control channel locations corresponding to the set of QCL SSBs, transmit, based on the parameter, a downlink grant for a system information over the set of downlink control channel locations corresponding to the set of QCL SSBs, transmit the system information according to the grant, and establish a connection with a UE based on the SSB and the system information.

Another apparatus for wireless communication at a base station is described. The apparatus may include means for transmitting a set of SSBs, the set of SSBs including a set of QCL SSBs, where each SSB of the set of SSBs includes an indication of a parameter indicating information associated with a set of downlink control channel locations corresponding to the set of QCL SSBs, transmitting, based on the parameter, a downlink grant for a system information over the set of downlink control channel locations corresponding to the set of QCL SSBs, transmitting the system information according to the grant, and establishing a connection with a UE based on the SSB and the system information.

A non-transitory computer-readable medium storing code for wireless communication at a base station is described. The code may include instructions executable by a processor to transmit a set of SSBs, the set of SSBs including a set of QCL SSBs, where each SSB of the set of SSBs includes an indication of a parameter indicating information associated with a set of downlink control channel locations corresponding to the set of QCL SSBs, transmit, based on the parameter, a downlink grant for a system information over the set of downlink control channel locations corresponding to the set of QCL SSBs, transmit the system information according to the grant, and establish a connection with a UE based on the SSB and the system information.

In some examples of the method, apparatuses, and non-transitory computer-readable medium described herein, the parameter includes an indication of an offset between successive SSBs within the set of QCL SSBs.

In some examples of the method, apparatuses, and non-transitory computer-readable medium described herein, transmitting the set of SSBs may include operations, features, means, or instructions for transmitting a PBCH portion of the SSB, the physical broadcast portion of the SSB including the indication of the parameter.

In some examples of the method, apparatuses, and non-transitory computer-readable medium described herein, the indication of the parameter may be common across each SSB of the set of SSBs.

A method of wireless communication at a UE is described. The method may include receiving a system information including a bitmap indicating a subset of SSBs transmitted from a set of SSBs, the system information signal further indicating a maximum number of SSBs available for use, where the maximum number of SSBs available for use is greater than a total number of SSBs in the set of SSBs, configuring rate matching based on the subset of SSBs indicated by the bitmap and the indicated maximum number of SSBs available for use, and receiving a PDSCH transmission based on the rate matching.

An apparatus for wireless communication at a UE is described. The apparatus may include a processor, memory in electronic communication with the processor, and instructions stored in the memory. The instructions may be executable by the processor to cause the apparatus to receive a system information including a bitmap indicating a subset of SSBs transmitted from a set of SSBs, the system information signal further indicating a maximum number of SSBs available for use, where the maximum number of SSBs available for use is greater than a total number of SSBs in the set of SSBs, configure rate matching based on the subset of SSBs indicated by the bitmap and the indicated maximum number of SSBs available for use, and receive a PDSCH transmission based on the rate matching.

Another apparatus for wireless communication at a UE is described. The apparatus may include means for receiving a system information including a bitmap indicating a subset of SSBs transmitted from a set of SSBs, the system information signal further indicating a maximum number of SSBs available for use, where the maximum number of SSBs available for use is greater than a total number of SSBs in the set of SSBs, configuring rate matching based on the subset of SSBs indicated by the bitmap and the indicated maximum number of SSBs available for use, and receiving a PDSCH transmission based on the rate matching.

A non-transitory computer-readable medium storing code for wireless communication at a UE is described. The code may include instructions executable by a processor to receive a system information including a bitmap indicating a subset of SSBs transmitted from a set of SSBs, the system information signal further indicating a maximum number of SSBs available for use, where the maximum number of SSBs available for use is greater than a total number of SSBs in the set of SSBs, configure rate matching based on the subset of SSBs indicated by the bitmap and the indicated maximum number of SSBs available for use, and receive a PDSCH transmission based on the rate matching.

In some examples of the method, apparatuses, and non-transitory computer-readable medium described herein, configuring rate matching may include operations, features, means, or instructions for repeating a pattern in the bitmap for the subset of SSBs within the set of SSBs and for SSBs occurring after the subset of SSBs and within the maximum number of SSBs available for use.

In some examples of the method, apparatuses, and non-transitory computer-readable medium described herein, receiving the system information may include operations, features, means, or instructions for receiving a previous PDSCH transmission including the system information, and decoding the system information to identify the bitmap, where rate matching may be not performed on the previous PDSCH.

In some examples of the method, apparatuses, and non-transitory computer-readable medium described herein, the PDSCH transmission may be received during a same discovery period in which the maximum number of SSBs may be transmitted available for use.

A method of wireless communication at a base station is described. The method may include transmitting a system information including a bitmap indicating a subset of SSBs transmitted from a set of SSBs, the system information further indicating a maximum number of SSBs available for use, where the maximum number of SSBs available for use is greater than a total number of SSBs in the set of SSBs, configuring rate matching based on the subset of SSBs indicated by the bitmap and the indicated maximum number of SSBs available for use, and performing a PDSCH transmission based on the rate matching.

An apparatus for wireless communication at a base station is described. The apparatus may include a processor, memory in electronic communication with the processor, and instructions stored in the memory. The instructions may be executable by the processor to cause the apparatus to transmit a system information including a bitmap indicating a subset of SSBs transmitted from a set of SSBs, the system information further indicating a maximum number of SSBs available for use, where the maximum number of SSBs available for use is greater than a total number of SSBs in the set of SSBs, configure rate matching based on the subset of SSBs indicated by the bitmap and the indicated maximum number of SSBs available for use, and perform a PDSCH transmission based on the rate matching.

Another apparatus for wireless communication at a base station is described. The apparatus may include means for transmitting a system information including a bitmap indicating a subset of SSBs transmitted from a set of SSBs, the system information further indicating a maximum number of SSBs available for use, where the maximum number of SSBs available for use is greater than a total number of SSBs in the set of SSBs, configuring rate matching based on the subset of SSBs indicated by the bitmap and the indicated maximum number of SSBs available for use, and performing a PDSCH transmission based on the rate matching.

A non-transitory computer-readable medium storing code for wireless communication at a base station is described. The code may include instructions executable by a processor to transmit a system information including a bitmap indicating a subset of SSBs transmitted from a set of SSBs, the system information further indicating a maximum number of SSBs available for use, where the maximum number of SSBs available for use is greater than a total number of SSBs in the set of SSBs, configure rate matching based on the subset of SSBs indicated by the bitmap and the indicated maximum number of SSBs available for use, and perform a PDSCH transmission based on the rate matching.

Some examples of the method, apparatuses, and non-transitory computer-readable medium described herein may further include operations, features, means, or instructions for repeating a pattern in the bitmap for transmitting the subset of SSBs within the set of SSBs and for a set of additional SSBs transmitted after the subset of SSBs and within the maximum number of SSBs available for use.

In some examples of the method, apparatuses, and non-transitory computer-readable medium described herein, transmitting the system information may include operations, features, means, or instructions for performing a previous PDSCH transmission including the system information.

DETAILED DESCRIPTION

Figure 1:
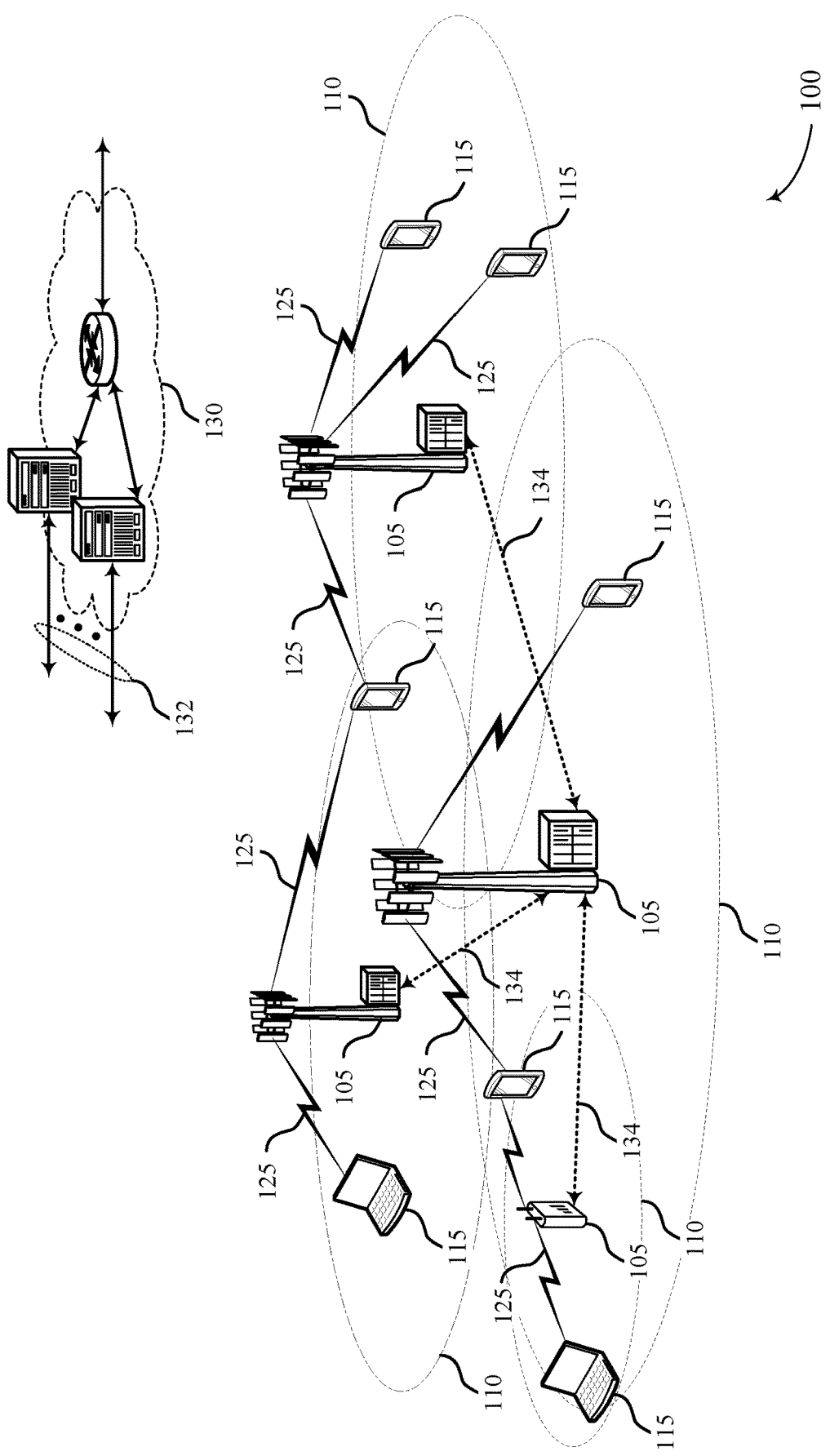
FIG. 1 illustrates an example of a system for wireless communications that supports control search space overlap indication in accordance with aspects of the present disclosure.

Wireless communication systems typically support a variety of communication techniques to support wireless communications between a base station and a user equipment (UE). For example, a base station may transmit a variety of synchronization signals (e.g., synchronization signal blocks (SSBs)) to support acquisition by UEs. Generally, the SSBs may carry or convey various parameters associated with the base station that the UE uses to align (in time, frequency, and the like) with the base station, at least to some degree, in order to establish a connection between the base station and the UE. Conventionally, a limited or defined number of SSBs are typically transmitted by the base station. In a millimeter wave (mmW) network, the base station may transmit the SSBs in beamformed transmissions in a sweeping manner around the coverage area of the base station.

Conventionally, the limited or defined number of SSBs available for transmission supported a one-to-one mapping between the SSBs and various control signal resources. For example, each SSB may have a corresponding set of control signal (e.g., physical downlink control channel (PDCCH)) resources associated with it, e.g., an index number for the SSB may correspond to a particular PDCCH resource. However, conventional techniques do not support a configuration were additional SSBs may be used for transmission and some SSBs may not be transmitted due to the outcome of a listen-before-talk (LBT) procedure on a carrier which requires an LBT procedure to be performed before transmission, e.g., may not provide a mechanism that supports an indication of PDCCH search space overlap. Accordingly, in the situation where additional SSBs are available transmission, conventional wireless networks may not support mapping a plurality of SSBs to a particular control channel resource.

Aspects of the disclosure are initially described in the context of a wireless communications system. The described techniques relate to improved methods, systems, devices, and apparatuses that support control search space overlap indication. Generally, the described techniques provide for various mechanisms that improve indicating overlapping control channel locations corresponding to a set of quasi-co-located (QCL) synchronization signal blocks (SSBs). For example, a base station may transmit a plurality of SSBs from a set of QCL SSBs. The SSBs selected for transmission from the set of QCL SSBs may be based on the results of an LBT procedure. In some aspects, each of the SSBs within the plurality of SSBs carry or otherwise convey an indication of an offset between successive SSBs within the set of QCL SSBs. Broadly, the offset may refer to a parameter carried or conveyed in the SSB (e.g., a physical broadcast channel (PBCH) portion of the SSB) that allows or otherwise supports the control channel location overlapping for different SSBs. A UE may receive one of the SSBs transmitted from the base station and determine the indicated offset. Based on this offset, the UE may determine a plurality of downlink control channel locations (e.g., physical downlink control channel (PDCCH) locations) that correspond to the set of QCL SSBs. The UE may use the determined downlink control channel locations to receive a downlink grant for a system information signal (e.g., a remaining minimum system information (RMSI)), e.g., by monitoring the downlink control channel locations. The UE may receive the system information according to the downlink grant and use the information in the system information (e.g., RMSI) as well as the SSB to establish a connection with the base station.

In other aspects, the described techniques may support rate matching operations of the UE. For example, the system information (e.g., RMSI) may carry or convey a bitmap that indicates a subset of SSBs that are actually being transmitted from a set of SSBs, e.g., the bits within the bitmap may be set to "1" to indicate that an SSB is transmitted in that location, or vice versa. In some aspects, the system information may additionally carry or convey an indication of a maximum number of SSBs available for use that is greater than the total number of SSBs in the set of SSBs. For example, the bitmap may be configured as "10101010" to indicate that SSB positions 0, 2, 4, and 6 are actually being transmitted within a set of SSBs consisting of SSB positions (or indices) 0-7. The indication of the maximum number of SSBs may be set to the number of the maximum SSB position being used, e.g., 12, 16, 18, or some other number of maximum SSB positions that may be used. The UE may configure rate matching based, at least in some aspects, on the subset of SSBs indicated by the bitmap as well as the indicated maximum number of SSBs available for use. In some aspects, this may include the UE having a rule or otherwise repeating the pattern of actually transmitted SSBs (e.g., the subset of SSBs within the set of SSBs) and the punctured SSB positions within the set of SSBs for the used SSB positions, e.g., the UE may repeat the pattern "10101010" for the SSB positions 8 through the end of the maximum number of SSBs available for use. Accordingly, the UE may receive a data transmission (e.g., a physical downlink shared channel (PDSCH)) transmission using the configured rate matching.

Aspects of the disclosure are further illustrated by and described with reference to apparatus diagrams, system diagrams, and flowcharts that relate to control search space overlap indication.

FIG. 1 illustrates an example of a wireless communications system 100 that supports control search space overlap indication in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may receive, from a base station 105, a SSB of a set of QCL SSBs, the SSB comprising an indication of a parameter indicating information associated with a plurality of downlink control channel locations corresponding to the set of QCL SSBs. The UE 115 may determine, based at least in part on the parameter, the plurality of downlink control channel locations corresponding to the set of QCL SSBs. The UE 115 may receive a downlink grant for a system information based at least in part on monitoring one or more downlink control channel locations of the plurality of downlink control channel locations. The UE 115 may receive the system information based at least in part on the downlink grant. The UE 115 may establish a connection with the base station 105 based at least in part on the SSB and the received system information block.

In some aspects, a base station 105 may transmit a plurality of SSBs, the plurality of SSBs comprising a set of QCL SSBs, wherein each SSB of the plurality of SSBs comprises an indication of a parameter indicating information associated with a plurality of downlink control channel locations corresponding to the set of QCL SSBs. The base station 105 may transmit, based at least in part on the parameter, a downlink grant for a system information over the plurality of downlink control channel locations corresponding to the set of QCL SSBs. The base station 105 may transmit the system information according to the grant. The base station 105 may establish a connection with the UE 115 based at least in part on the synchronization signal block and the system information.

In some aspects, a UE 115 may receive a system information comprising a bitmap indicating a subset of SSBs transmitted from a set of SSBs, the system information signal further indicating a maximum number of SSBs available for use, wherein the maximum number of SSBs available for use is greater than a total number of SSBs in the set of SSBs. The UE 115 may configure rate matching based at least in part on the subset of SSBs indicated by the bitmap and the indicated maximum number of SSBs available for use. The UE 115 may receive a PDSCH transmission based at least in part on the rate matching.

In some aspects, a base station 105 may transmit a system information comprising a bitmap indicating a subset of SSBs transmitted from a set of SSBs, the control signal further indicating a maximum number of SSBs available for use, wherein the maximum number of SSBs available for use is greater than a total number of SSBs in the set of SSBs. The base station 105 may configure rate matching based at least in part on the subset of SSBs indicated by the bitmap and the indicated maximum number of SSBs being used. The base station 105 may perform a PDSCH transmission based at least in part on the rate matching.

Figure 2:
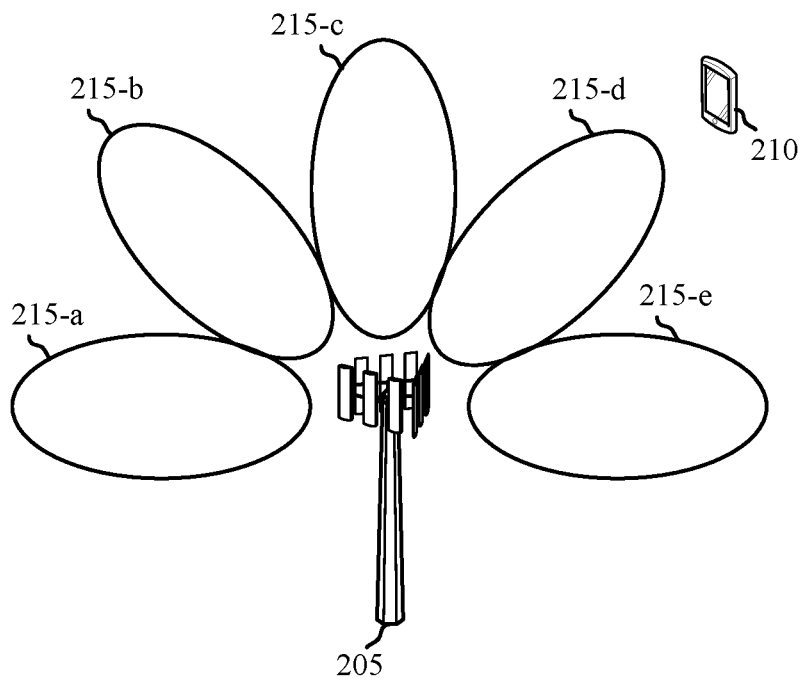
FIG. 2 illustrates an example of a wireless communication system that supports control search space overlap indication in accordance with aspects of the present disclosure.

FIG. 2 illustrates an example of a wireless communication system 200 that supports control search space overlap indication in accordance with aspects of the present disclosure. In some examples, wireless communication system 200 may implement aspects of wireless communications system 100. Generally, wireless communications system 200 may include a base station 205 and UE 210, which may be examples of corresponding devices described herein. In some aspects, base station 205 may be considered a potential or current serving base station from the perspective of UE 210.

In some aspects, wireless communication system 200 may be configured to support various aspects of the described techniques for control search space overlap indication. Generally, conventional networks typically defined a one-to-one correspondence between an SSB and a downlink control channel location (e.g., a PDCCH location). For example, each SSB may have an associated index and that index may correspond to, or otherwise be associated with, a particular downlink control channel location (e.g., such as a location of a control channel carrying a grant for additional system information). A UE (such as UE 210) attempting to establish a connection with base station 205 will typically monitor for, and detect an SSB having an associated index and, based on the index of the SSB, identify the corresponding downlink control channel location. As one non-limiting example, an initial access UE (e.g., UE 210) may detect an SSB having an index of 5. The initial access UE may know that SSB index 5 corresponds to a particular downlink control channel location, e.g., based on a look-up table or some other configured information. The initial access UE may monitor the downlink control channel location corresponding to SSB index 5 to receive a downlink grant for resources carrying the additional system information (e.g., resources for a PDSCH that carries an RMSI, which may also be referred to as a RMSI PDSCH). Conventionally, the location of the downlink control channel may be carried or conveyed in a bit or field of a broadcast channel (such as a physical broadcast channel (PBCH)) of base station 205.

However, such conventional techniques may be unusable in some configurations. For example, in some aspects the number of SSBs that are available or otherwise may be used by base station 205 may exceed the number of available downlink control channel locations, e.g., accordingly the one-to-one mapping technique may be unusable. Moreover, in a mmW network base station 205 may transmit its SSBs using beamformed transmissions that are transmitted in a sweeping manner within the coverage area of base station 205. In some aspects, this may include base station 205 transmitting a plurality of QCL SSBs within its coverage area that is more than the available corresponding downlink control channel locations. However, it is to be understood that QCL SSBs are not limited to a mmW network and, instead, may refer to non-mmW networks.

Moreover, some wireless networks may operate in a shared or unlicensed radio frequency spectrum band where a listen-before-talk (LBT) procedure must be performed on the channel before any transmission may occur. In this example, the LBT procedure performed by base station 205 may be unsuccessful for some instances of configured SSB transmission, which may further introduce confusion into the network.

In some aspects, the SSBs may be transmitted within a particular discovery period (e.g. such as a discovery reference signal (DRS) period). Again, in some instances the LBT procedure may be successful for some SSB transmissions within the DRS period, but unsuccessful for the other SSB transmission instances within the DRS period. Accordingly, the configured pattern of SSB transmissions may be interrupted within the DRS depending upon the results of the LBT procedure, e.g., based on the success or failure of the LBT procedure. Accordingly, aspects of the described techniques provide a mechanism where the overlap (e.g., many-to-one) relationship between multiple SSB indices correspond to downlink control channel locations may be supported by base station 205 and/or UE 210.

For example, base station 205 may support a plurality of SSBs 215 being available for transmission. In some aspects, this may include a set of QCL SSBs being transmitted in beamformed transmissions in a sweeping manner around the coverage area of base station 205. For example, a first SSB 215-a may be transmitted in a first beamformed direction, a second SSB 215-b may be transmitted in a second beamformed direction, a third SSB 215-c may be transmitted in a third beamformed direction, a fourth SSB 215-d may be transmitted in a fourth beamformed direction, a fifth SSB 215-e may be transmitted in a fifth beamformed direction, and so on. Broadly, each SSB 215 may carry or convey an indication of certain synchronization information usable by initial access UEs (e.g., UE 210) that are looking for a base station to connect to. For example, each SSB 215 may carry or convey synchronization information (e.g., timing information, frequency information, spatial information, and the like). The initial access UE may use this information to detect or otherwise receive additional system information from base station 205 in order to establish a connection between base station 205 and the initial access UE. Accordingly, base station 205 may transmit a plurality of SSBs 215, wherein at least one of the SSBs 215 (e.g., SSB 215-d) may be detected or otherwise received by UE 210.

In accordance with aspects of the described techniques, the SSBs 215 transmitted by base station 205 may comprise or otherwise form a set of QCL SSBs. For example, base station 205 may transmit a plurality of instances of the SSBs 215 within the defined period, such as a DRS period, within a certain number of slot(s)/frame(s), and the like. In some aspects, the set of QCL SSBs may consist of SSBs 215 having the same (or substantially similar) QCL configuration. For example and when base station 205 transmits SSBs 215 in a sweeping manner twice within the period, two instances of SSB 215-d may be considered a set of QCL SSBs. In the example where base station 205 transmits SSBs 215 three times within the period, three instances of SSB 215-d may be considered the set of QCL SSBs. Accordingly, base station 205 may transmit the plurality of SSBs 215 (e.g., SSBs 215-a, 215-b, 215-c, 215-d, and 215-e) in a repetitive manner such that the set of QCL SSBs 215 may include multiple instances of the same SSB 215 being transmitted (e.g., multiple instances of SSB 215-d). However, it is to be understood that each instance of the SSB 215 within the set of QCL SSBs would have its own index number. For example, a first instance of SSB 215-d may have an index of 0, whereas the next instance of SSB 215-d may have an index of 4 (or some other pattern). In some aspects, the SSBs 215 being transmitted may also have a broadcast channel, such as a physical broadcast channel (PBCH) portion of the SSB 215.

In some aspects, each SSB 215 being transmitted by base station 205 may also carry or convey an indication of a parameter that indicates or otherwise conveys information associated with the plurality of downlink control channel locations corresponding to the set of QCL SSBs. In some aspects, the parameter (e.g., parameter "X") may allow a location of the downlink control channel to overlap (e.g., the location of the downlink control channel may correspond to the SSB indices from the set of QCL SSBs). In some aspects, the downlink control channel may refer to a type-0 PDCCH, such as a common search space PDCCH. In some aspects, the parameter X may be an integer number that is no higher than a defined value (e.g., no more than 8, which may be the agreed maximum number of SSBs 215 available for transmission). The parameter X may use three bits to carry or convey the information. In some aspects, the parameter X may be a subset of integer numbers and the set of values that X may take may have a size of 1/2/4/8 etc., (e.g., be a power of two) in order to save the number of bits needed to convey the information. In some aspects, the parameter X may be common across all SSBs 215 being transmitted by the base station 205. For example, the parameter X may be common across all PBCH and in all SSBs 215 actually transmitted. This may support UE 210 using soft combining techniques for broadcast channel detection of the parameter. In the example where base station 205 transmits SSBs 215 in beamformed transmissions, the parameter X may not necessarily be the same as the number of beams, e.g., may be larger depending upon base station 205 choice.

Accordingly, UE 210 (e.g., an initial access UE in this instance) may receive an SSB 215 (e.g. SSB 215-d) from the set of QCL SSBs (e.g., multiple instances of SSB 215-d and/or multiple SSBs 215 having the same or similar QCL configuration). UE 210 may recover the parameter X from the receive SSB and use the parameter to determine the plurality of downlink control channel locations corresponding to the set of QCL SSBs. As discussed, each instance of the SSB 215 may have its own associated index value (e.g., SSB 215 index "x"). As one example, UE 210 may receive SSB 215-d having an SSB index of one (e.g., x=1) and the parameter may indicate a value corresponding to the set of QCL SSBs (e.g., X=4). For downlink control channel (e.g., a PDCCH carrying a grant for an RMSI PDSCH) detection, UE 210 may search or monitor each downlink control channel location that corresponds to SSB z, where z mod X=x mod X. In the example where x=1 and X=4, UE 210 receives or otherwise monitors downlink control channel locations (PDCCH locations) that correspond to SSB indexes of 1, 5, 9, and so on. In some aspects, a PDCCH monitoring occasion "z" may occur only in slots and radio frames on which SSBs can be potentially transmitted so the UE 210 can check to see if the PDCCH monitoring occasion is a potential SSB slot in addition to the modulo condition z mod X=x mod X to determine whether to monitor PDCCH for control channel information during that monitoring occasion. In some aspects, the downlink control channel location may be a function of the radio frame number, which may be determined through the PBCH and the maximum number of SSB transmission opportunities.

Accordingly, UE 210 may detect or otherwise receive an SSB 215 having indices of 1 and, based on the parameter X, determine the SSB indices of 5, 9, and so on, are also associated with certain downlink control channel locations. In some aspects, the downlink control channel (e.g. RMSI PDCCH) may be transmitted in the next frame, the LBT procedure may be independent, and the starting point may be later than x=1, and so UE 210 may continue searching. This may support UE 210 being able to identify the locations to monitor for the downlink control channel that correspond to the set of QCL SSBs.

Accordingly, UE 210 may receive a downlink grant for a system information (e.g., PDSCH RMSI) based on monitoring and receiving a downlink control channel (e.g., PDCCH) that carries or conveys the downlink grant. Based on the downlink grant, UE 210 may receive the system information (e.g., RMSI) and establish a connection with base station 205 according to the received SSB 215-d (in this example) and the system information.

Another issue relating to conventional networks may relate to SSB 215 rate matching. For example, in some examples of the conventional techniques the system information (e.g., RMSI) may carry or convey a bitmap (e.g., an 8-bit bitmap) that indicates which SSBs 215 within set of the available SSBs 215 are being transmitted. For example, base station 205 may have a set of SSBs 215 that may be transmitted (e.g., each of SSBs 215-a through 215-e), but may actually only transmit a subset of SSBs 215 (e.g., such as SSBs 215-a, 215-c, 215-e, and so on). Conventionally, UE 210 may receive the system information in one PDSCH transmission, and use the information indicated in the bitmap to configure or otherwise perform rate matching around the resource blocks/symbols used by the indicated SSBs in subsequent PDSCH transmissions. Such conventional techniques, however, are based on the fact that the set of and/or actually transmitted SSBs 215 are the same across all frames. Such conventional techniques do not support the configuration where the available and/or actually transmitted SSBs 215 change (e.g., within a discovery period, between different frames or sets of frames, and the like). Accordingly, UE 210 may be unable to configure or otherwise perform rate matching in the situation where the available and/or actually transmitted SSBs 215 change.

Additionally, conventional techniques size the bitmap corresponding to a maximum size of available SSB transmission opportunities for a licensed carrier where SSBs can always be transmitted. In an unlicensed carrier, where the transmissions have to undergo an LBT procedure before transmission, conventional techniques do not configure a much larger number of the available SSB transmission opportunities despite the fact that many SSB transmission opportunities may not be usable at any particular instance due to LBT failure. Accordingly, the bitmap size may be increased for the largest size anticipated to be used in an unlicensed system which would entail high overhead. Hence alternate solutions are desirable.

Accordingly, aspects of the described techniques provide a mechanism (e.g., rule) that supports UE 210 being able to configure or otherwise perform rate matching for a situation where the available and/or actually transmitted SSBs 215 change. In some aspects, the bitmap indicated in the system information may be used (e.g., an 8-bit bitmap). However, the system information may also carry or convey an indication of a maximum number of SSBs 215 available for use. In some aspects, the maximum number of SSBs 215 available for use may be greater than a total number of SSBs 215 indicated by the bitmap (e.g., due to bitmap size).

For example, the system information (e.g., RMSI) may carry or convey the bitmap that indicates the subset of SSBs 215 transmitted from the set of SSBs 215. As one example, the bitmap may be set to 10101010 to indicate that SSBs 215 having indices of 0, 2, 4, and 6 are actually being transmitted and SSBs 215 having indices of 1, 3, 5, and 7 are not being transmitted. Thus, the set of SSBs 215 may include SSBs 215 having indices 0-7, whereas the subset of SSBs 215 actually being transmitted only includes SSBs 215 having indices of 0, 2, 4, and 6.

In some aspects, the maximum number of SSBs 215 available for use may be greater than the set of SSBs 215 indicated by the bitmap (e.g., due to the size of the bitmap). For example, the system information (e.g., RMSI) may indicate (e.g., in a parameter) the maximum number of SSB 215 positions available for use. As one non-limiting example, the maximum number of SSBs 215 available for use may be 12, 16, 24, 32, or some other number of SSBs 215. In some aspects, the maximum number of SSBs 215 available for use may refer to potential SSB 215 locations occurring within a particular time window, such as a DRS, within a particular set of slots or frames, and the like.

Based on receiving the system information, UE 210 may be able to determine or otherwise ascertain that there are 16 (in one example) maximum number of SSBs 215 available for use and that the bitmap indicates the pattern of actually transmitted SSBs 215 within the set of SSBs 215 indicated by the bitmap (e.g., on, off, on, off, etc., in the example above for the first eight SSBs, where the size of the bitmap is eight). According to aspects of the described techniques, UE 210 may repeat the pattern in the bitmap for the SSBs 215 transmitted after the set of SSBs 215 indicated by the bitmap. For example and for the first eight SSB 215 positions, UE 210 may determine that SSBs 215 having indices of 0, 2, 4, and 6 are actually transmitted and SSBs 215 having indices of 1, 3, 5, and 7 are not being transmitted. Repeating the pattern may include UE 210 determining that SSBs 215 having indices of 8, 10, 12, 14, and so on are being transmitted and SSBs 215 having indices of 9, 11, 13, 15, and so on are not being transmitted for the purposes of rate matching for subsequent PDSCH. Accordingly, based on the bitmap and the parameter indicated in the system information, UE 210 may use a rule where the SSBs 215 occurring after the subset of SSBs 215 (or rather after the set of SSBs 215) and within the maximum number of SSBs 215 are repeated according to the pattern indicated in the bitmap.

Accordingly, UE 210 may receive the bitmap and the indication of the maximum number of SSBs 215 available for use (e.g., in a first RMSI PDSCH) and use this information to configure rate matching for receiving PDSCH transmissions. In some aspects, UE 210 may use the bitmap and indication of the maximum number of SSBs 215 available for use to configure or otherwise perform rate matching in subsequent PDSCH transmissions from base station 205. For example, UE 210 may use the configured rate matching for the subsequent PDSCH transmissions by rate matching around SSBs 215 indicated as being transmitted in (or at the same time as) the subsequent PDSCH transmissions. This may support UE 210 rate matching around all potential SSB 215 transmissions as indicated by the bitmap with the repetition up to the maximum number of SSBs 215 available for use. In some aspects, UE 210 may further configure rate matching resource sets to rate match into the SSBs not transmitted (e.g., an SSBs 215 having indices of 1, 3, 5, and so on, up to the maximum number of SSBs 215 available for use). Accordingly, UE 210 may receive the PDSCH transmission according to the rate matching configured based on the bitmap and the indication of the maximum number of SSBs 215 available for use.

In some aspects, the described techniques for rate matching configuration may be associated with a particular discovery period (e.g., such as a DRS). For example, various aspects of SSB 215 transmission may change periodically, as needed, according to a schedule, and the like. Accordingly, base station 205 may update the SSBs 215 depending upon the changes to the SSB 215 transmission configuration and the associated time period or window. In one example, the configuration for transmission of SSBs 215 may change for each or some or all DRS periods.

Figure 3:
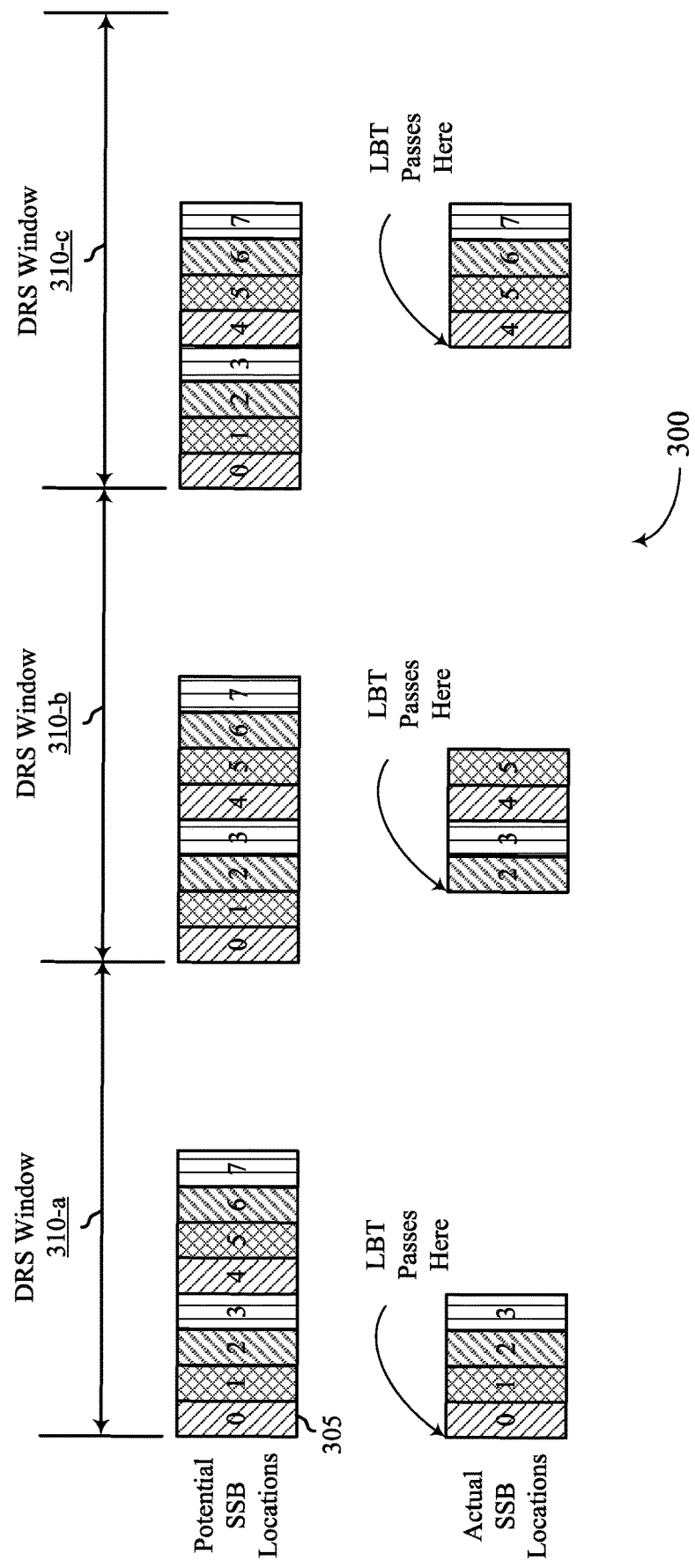
FIG. 3 illustrates an example of a SSB configuration that supports control search space overlap indication in accordance with aspects of the present disclosure.

FIG. 3 illustrates an example of a SSB configuration 300 that supports control search space overlap indication in accordance with aspects of the present disclosure. In some examples, SSB configuration 300 may implement aspects of wireless communication systems 100 and/or 200. Aspects of SSB configuration 300 may be implemented by a base station and/or UE, which may be examples of the corresponding devices described herein.

Broadly, SSB configuration 300 illustrates one example of how SSBs 305 may be transmitted in accordance with aspects of the described techniques. In some aspects, the base station may be configured to transmit a plurality of SSBs 305 (with only one SSB 305 being labeled for ease of reference) to one or more UEs operating within its coverage area. For example, SSBs 305 having indices of 0-7 may be considered a first plurality of SSBs that are configured for potential transmission during a specified time period or window, such as a DRS window 215. Accordingly, the base station may transmit the plurality of SSBs 305 having indices 0-7 during a first DRS window 310-*a*, transmit the plurality of SSBs 305 having indices 0-7 during a second DRS window 310-*b*, and transmit the plurality of SSBs 305 having indices 0-7 during third DRS window 310-*c*. In some aspects, the number and/or configuration for SSBs 305 may change from one DRS window 310 to the next.

Broadly, SSBs 305 may be used by an initial access UE to ascertain synchronization (at least to some degree) information for the transmitting base station. For example, each SSB 305 may carry or convey various frequency, timing, spatial, and the like information usable by the UE to establish a connection with the base station. In some aspects, the plurality of SSBs may be transmitted within a given window or time period, such as a DRS window 315.

In some aspects, the plurality of SSBs 305 may include a set of QCL SSBs. In some aspects, the number of SSBs 305 within a set of QCL SSBs may be consistent for a given DRS window 310, but may be the same or may change from one DRS window 310 to the next. In some aspects, the plurality of SSBs 305 may include multiple sets of QCL SSBs. As one non-limiting example, SSBs 305 having indices of 0 and 4 may form a first set of QCL SSBs (indicated by the forward slanting hashing pattern), SSBs 305 having indices 1 and 5 may form a second set of QCL SSBs (indicated by the cross-hashing pattern), SSBs 305 having indices 2 and 6 may form a third set of QCL SSBs (indicated by the reverse slanting hashing pattern), and SSBs 305 having indices 3 and 7 may form a fourth set of QCL SSBs (indicated by the horizontal line hashing pattern).

Conventionally, an initial access UE may receive an SSB 305 and, based on the index of the received SSB 305, the UE may know that index is associated with a corresponding downlink control channel location (e.g., time, frequency, spatial, or other location for the UE to use to monitor for PDCCH signals). However, aspects of the described techniques support a mechanism where additional candidate SSB 305 positions may be configured. That is, the plurality of SSBs 305 may include more than the illustrated eight SSBs 305 shown in FIG. 3, e.g., may include 12, 16, or some other number of potential SSB 305 positions. In some aspects, the number of actually transmitted SSBs may be less than the number of possible SSB 305 positions. In this situation, each set of QCL SSBs may include more than the two SSBs 305 discussed in the example above. For example, the first set of QCL SSBs may include SSBs 305 with indices of 0, 4, 8 (not shown), 12 (also not shown), and so on.

Moreover, some wireless networks may operate in a mmW network where the base station must perform an LBT procedure before transmitting each (or some or all) SSB(s) 305. As can be appreciated, not every LBT procedure may be successful, and therefore the base station may be unable to transmit SSBs 305 until the LBT procedure succeeds. As a first example and during the DRS window 310-*a*, the LBT procedure may successful such that the base station is able to begin transmitting SSB 305 starting with SSB index 0. However, in a second example and during the DRS window 310-*b*, the LBT procedure may not pass initially, but instead pass or succeed in time for the base station to begin transmitting SSBs 305 beginning with SSB index 2. In a third example and during the DRS window 310-*c*, the LBT procedure may not pass until the time when the SSB 305 having an index of 4 is scheduled for transmission. Accordingly, the number of SSBs 305 transmitted may vary depending on whether or not the LBT procedure is successful. In some examples, the base station may choose to transmit only four SSBs of the configured eight to minimize the number of SSBs actually transmitted while ensuring that SSBs from each of the four sets of QCL SSBs are transmitted at least once.

All of these issues may create problems for an initial access UE wishing to establish a connection with the base station. For example, the UE may detect or otherwise receive an SSB 305 having an index of 1. Conventionally, the UE would use the index of the received SSB 305 to identify the location for monitoring a downlink control channel (e.g., PDCCH) as conventional techniques utilized a one-to-one mapping between the SSB 305 index and the corresponding downlink control channel location. However, this approach may be problematic when multiple SSB indexes overlap with the same (or substantially the same) downlink control channel location, e.g., such as when a set of QCL SSBs are used or when some of the SSB locations are not transmitted due to LBT failures. For example, on detecting the SSB at location 1, in conventional systems the UE may look for PDCCH corresponding to the same QCL in the vicinity of SSB location 1 in subsequent DRS occasions. However, in subsequent DRC occasions SSB and system information may not be sent in location 1 due to LBT failure, but may be sent in location 5. Since location 5 and location 1 have the same QCL, if the UE had looked for the PDSCH/system information in the vicinity of location 5, it would have been able to receive the system information.

Accordingly, aspects of the described techniques provide a mechanism where each SSB 305 has a corresponding index, but a set of QCL SSBs may be associated with the same (or substantially similar) downlink control channel location. In some aspects, this may include the base station configuring the SSB to include or otherwise convey an indication of a parameter indicating information associated with downlink control channel locations corresponding to the set of QCL SSBs. For example, the parameter (e.g., parameter "X") may be an integer number or subset of integer numbers, depending on the number of bits used to convey the indication of the parameter in each SSB 305. Generally, each SSB 305 within the set of QCL SSBs may have the same or substantially similar QCL configurations. In some examples, the parameter may not necessarily be tied to the number of beams being used for transmitting SSBs 305.

The UE may receive the SSB 305 (e.g., SSB index 1, or x=1) and determine the parameter indicated in the SSB 305. The UE may use this information to determine the downlink control channel location(s) that correspond to the set of QCL SSBs. Generally, the downlink control channel location(s) may refer to time, frequency, spatial, or some other resource used by the base station for transmitting the downlink control channel. The UE may receive (e.g., by monitoring) the determined downlink control channel locations that correspond to the set of QCL SSBs to receive a downlink grant for a system information (e.g., RMSI PDSCH) on at least one of the downlink control channel locations. The UE may receive the system information according to the grant and establish a connection to the base station based on the received SSB 305, the system information, and the like.

As discussed, in some aspects the parameter may carry or convey an indication of an offset between successive SSBs 305 within the set of QCL SSBs. In the example discussed above, SSBs 305 having indices 0 and 4 may be considered a first set of QCL SSBs where, in this example, the parameter may indicate a value of "4" to inform the UE that every fourth SSB 305 may have or otherwise use the same or similar QCL configuration and/or may be associated with the same or similar PDCCH location. Accordingly, the UE receiving SSB 305 with index 1 may know that SSB 305 with index 5 may use the same or substantially similar QCL configuration.

In some aspects, some or all of the SSB 305 may be carried or conveyed in a PBCH. As the same parameter may be duplicated in each SSB 305, the UE may perform soft combining across a plurality of SSBs 305 to determine the indicated parameter.

Figure 4A:
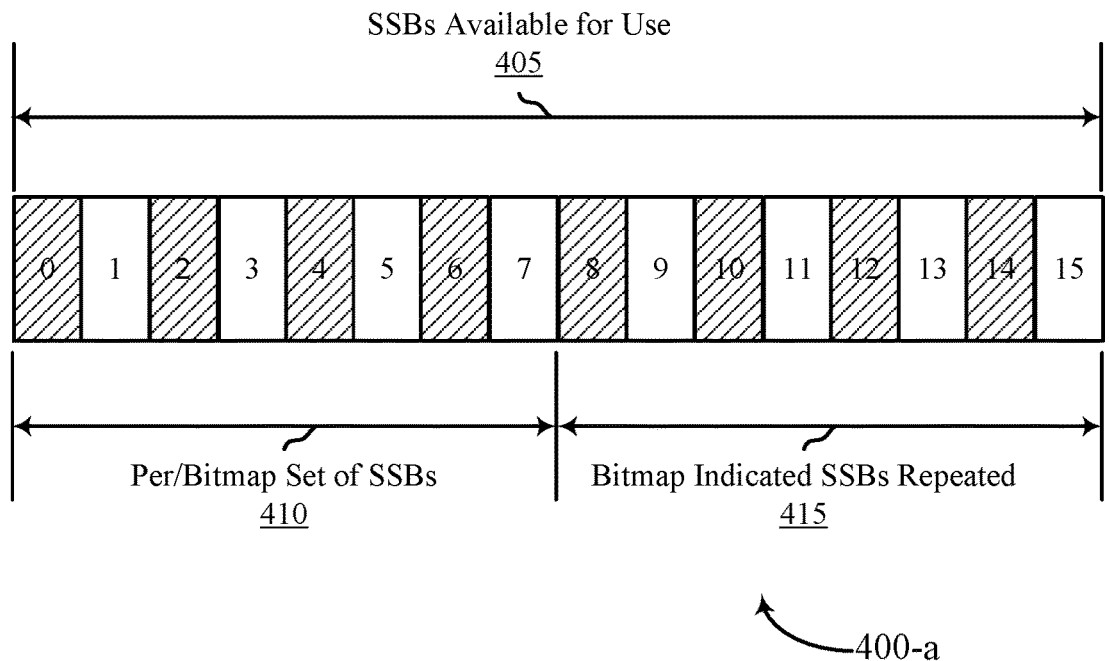
FIGS. 4A and 4B illustrate examples of a SSB configuration that supports control search space overlap indication in accordance with aspects of the present disclosure.
Figure 4B:
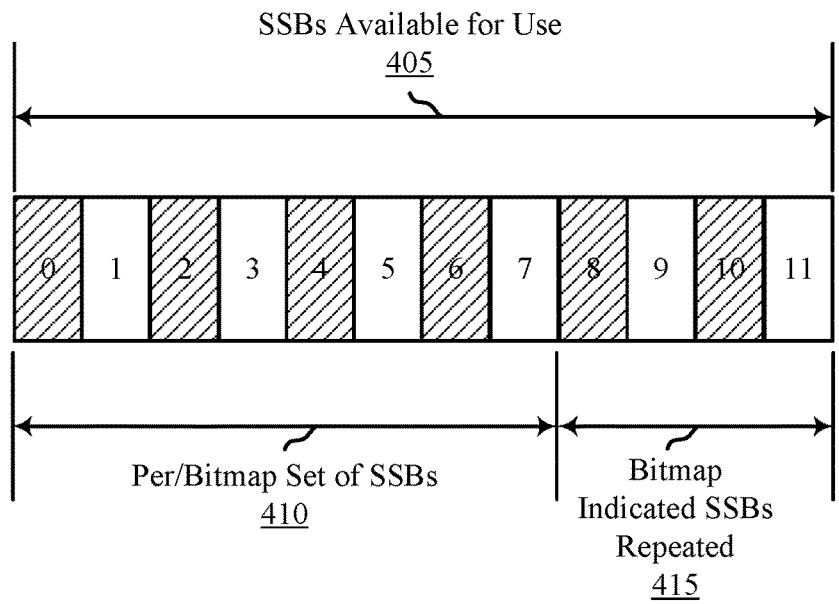

FIGS. 4A and 4B illustrate examples of SSB configuration 400 that supports control search space overlap indication in accordance with aspects of the present disclosure. In some examples, SSB configuration 400 may implement aspects of wireless communication systems 100 and/or 200, and/or SSB configuration 300. Aspects of SSB configuration 400 may be implemented by a base station and/or UE, which may be examples of corresponding devices described herein.

As discussed, conventional techniques typically include an RMSI PDSCH carrying or conveying an indication of an 8-bit bitmap indicating which set of a maximum number of 8 SSBs that are actually being transmitted. PDSCH transmissions will rate match around the resource blocks/symbols used by the indicated SSBs. However, this design is based on the fact that the set of SSBs actually transmitted across all frames are the same. Accordingly, conventional techniques do not support the scenario where the actual number of SSBs being transmitted and/or being available may vary from one frame to the next, from one DRS period to the next, and so on. Additionally, the conventional techniques sized the bitmap corresponding to a maximum size of available SSB transmission opportunities for a licensed carrier where SSBs can always be transmitted. In unlicensed carrier, where the transmissions have to undergo an LBT procedure before transmission, we may wish to configure a much larger number of the available SSB transmission opportunities as many SSB transmission opportunities may not be usable at any particular instance due to LBT failure. Hence we could increase the bitmap size for the largest size anticipated to be used on an unlicensed system which would entail high overhead. Hence alternate solutions are desirable. Accordingly, aspects of the described techniques support improved rate matching behavior in such a scenario.

For example, a base station may transmit a maximum number of SSBs 405 available for use. Generally, the maximum number of SSBs 405 available for use may refer to possible positions where the SSB transmissions may occur. In the example illustrated in FIG. 4A, the maximum number of SSBs 405 available for use may include 16 SSB positions, whereas the maximum number of SSBs 405 available for use illustrated in FIG. 4B may include 12 SSB positions. Other configurations for the maximum number of SSBs 405 available for use may also be used.

In some aspects, the bitmap used in the conventional networks may be applied, at least in some aspects, in accordance with the described techniques. For example, a base station may transmit (and UE may receive) a system information (e.g., RMSI PDSCH) that carries or conveys an indication of the bitmap indicating the subset of SSBs transmitted from the set of SSBs. With reference to SSB configurations 400-a and 400-b, the bitmap may be set to "10101010" to indicate that the set of SSBs includes SSBs having indices 0-7. In this context, the set of SSBs may refer to each of the SSBs having indices 0-7, where the subset of SSBs actually being transmitted from the set of SSBs may include SSBs having indices 0, 2, 4, and 6 (as illustrated by the hash pattern). The information or pattern indicated in the bitmap may refer to the per/bitmap SSBs 410.

Figure 12:
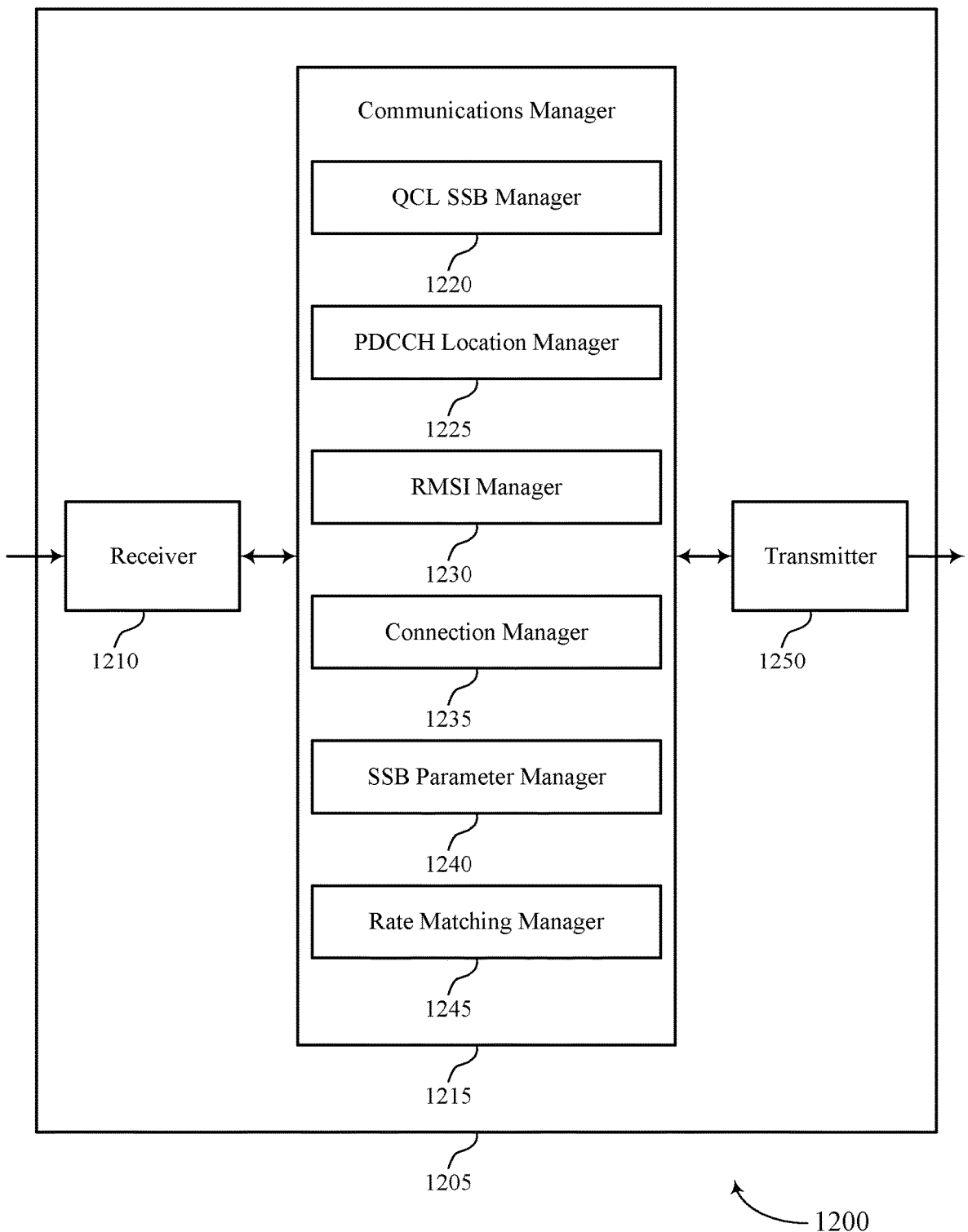

However, the maximum number of SSBs 405 available for use in this scenario may be greater than the set of SSBs (e.g., the maximum number of SSBs 405 available for use may be 16 as illustrated in FIG. 4A or 12 as illustrated in FIG. 4B). Accordingly, the base station may also configure the system information to carry or convey an indication of the maximum number of SSBs 405 available for use (e.g., the maximum SSB positions being used). For example, the system information may include a bit or field configured to convey the indication of the maximum number of SSBs available for use (e.g., a fixed count of used SSBs, an end location for the last used SSB, and the like).

In some aspects, the UE may receive the system information and recover the bitmap and the indication of the maximum number of SSBs available for use. The UE may use this information to configure rate matching for PDSCH transmissions. In some aspects, this may include the UE repeating the pattern indicated in the bitmap for SSBs that occur after the SSBs in the set of SSBs (e.g., that occur after the subset of SSBs actually transmitted). In the example discussed above, the pattern may generally refer to a first SSB being transmitted (SSB index 0), a second SSB not being transmitted (SSB index 1), the third SSB being transmitted (SSB index 2), a fourth SSB not being transmitted (SSB index 3), and so on. The UE may use this pattern for the remaining SSBs within the maximum number of SSBs 405 available for use. For example, the UE may know that SSB index 8 will be transmitted, that SSB index 9 will not be transmitted, that SSB index 10 will be transmitted, and so on (this is illustrated as the bitmap indicated SSBs repeated 415). Accordingly, the UE may use this information based on the bitmap and the maximum number of SSBs 405 available for use for PDSCH rate matching. References to an SSB corresponding to an SSB index that will be transmitted, may also refer to a UE assumption of SSB transmission in regards to PDSCH rate matching, the base station may not actually be transmitting that particular SSB. In some aspects, the UE may receive the bitmap and the indication of the maximum number of SSBs 405 available for use in a first PDSCH (e.g., an RMSI PDSCH), and use the configured rate matching in subsequent PDSCH transmissions (e.g., and non-RMSI PDSCH transmissions). For example, the UE may rate match around the SSBs being transmitted during the subsequent PDSCH transmissions.

In the example illustrated in FIG. 4B, the UE may use the bitmap (or the pattern indicated in the bitmap) and the indication of the maximum number of used SSB to determine that the SSB index 8 is being transmitted, that SSB index 9 is not being transmitted, that SSB index 10 is being transmitted, and that SSB index 11 is not being transmitted (again, this is illustrated as the bitmap indicated SSBs repeated 415). Accordingly, for the subsequent PDSCH transmissions, the UE may use this information to rate match around SSBs actually being transmitted.

Figure 5:
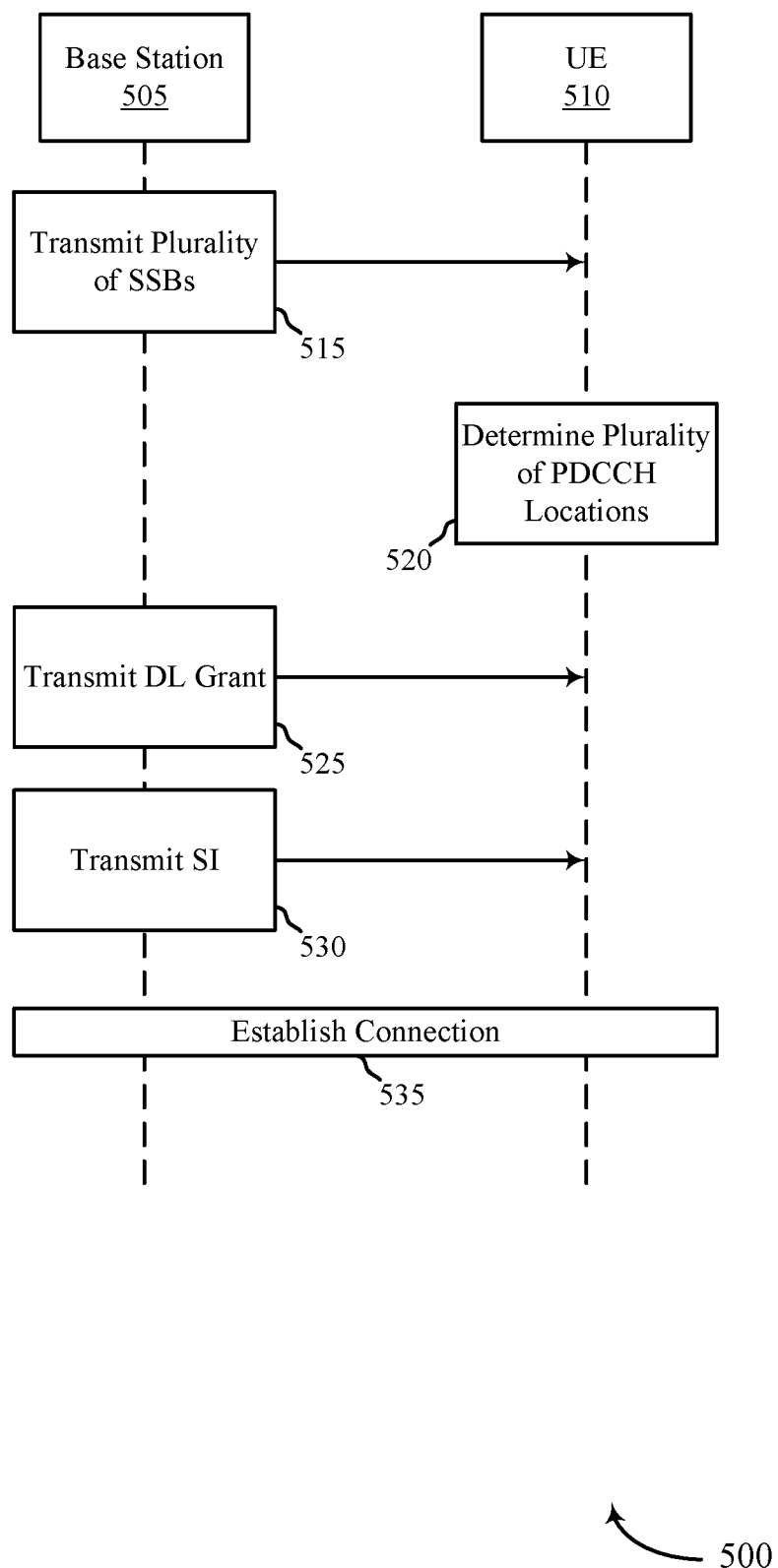
FIG. 5 illustrates an example of a process that supports control search space overlap indication in accordance with aspects of the present disclosure.

FIG. 5 illustrates an example of a process 500 that supports control search space overlap indication in accordance with aspects of the present disclosure. In some examples, process 500 may implement aspects of wireless communication systems 100, 200, and/or SSB configurations 300, 400. Aspects of process 500 may be performed by a base station 505 and/or UE 510, which may be examples of corresponding devices described herein.

At 515, base station 505 may transmit (and UE 510 may receive) an SSB of a set of QCL SSBs. In some aspects, the SSB may carry or convey an indication of a parameter indicating information associated with a plurality of downlink control channel locations that correspond to the set of QCL SSBs. In some aspects, the parameter may carry or convey an indication of an offset between successive SSBs within the set of QCL SSBs. In some aspects, this may include base station 505 transmitting (and UE 510 receiving) a PBCH portion of the SSB, e.g., the PBCH portion may carry or convey the indication of the parameter. In some aspects, UE 510 may receive multiple instances of the SSB (or PBCH portions of the SSB) and use soft combining across the multiple SSBs to recover the parameter.

In some aspects, base station 505 may transmit a plurality of SSBs to one or more UEs located within its coverage area. In some aspects, each SSB may additionally convey or indicate various synchronization information usable by such UEs to synchronize, at least to some degree, with base station 505.

At 520, UE 510 may determine, based at least in part on the parameter, the plurality of downlink control channel locations corresponding to the set of QCL SSBs. In some aspects, this may include UE 510 determining an index of each SSB of the set of QCL SSBs. UE 510 may use the index to determine the plurality of downlink control channel locations. In some aspects, this may be based on the frame in which the SSB is received and the parameter indicated in the SSB. In some aspects, the plurality of downlink control channel locations may refer to a type-0 PDCCH common search space.

At 525, base station 505 may transmit (and UE 510 may receive) a downlink grant for a system information based at least in part on UE 510 monitoring one or more of the downlink control channel locations. In some aspects, this may include UE 510 monitoring each downlink control channel location of the plurality of downlink control channel locations in order to receive the downlink grant. For example, UE 510 may determine that no downlink control information was detected during a first instance of the plurality of downlink control channel locations (e.g., in a first downlink control channel location). Accordingly, UE 510 may monitor the second instance of the plurality of downlink control channel locations (e.g., in a second, third, fourth, etc., downlink control channel location as needed) to detect the downlink grant.

At 530, base station 505 may transmit (and UE 510 may receive) the system information according to the downlink grant. In some aspects, the system information may refer to an RMSI indicated in a PDSCH transmission from base station 505. At 535, base station 505 and UE 510 may establish a connection based at least in part on the SSB received at 515 and the system information.

Figure 6:
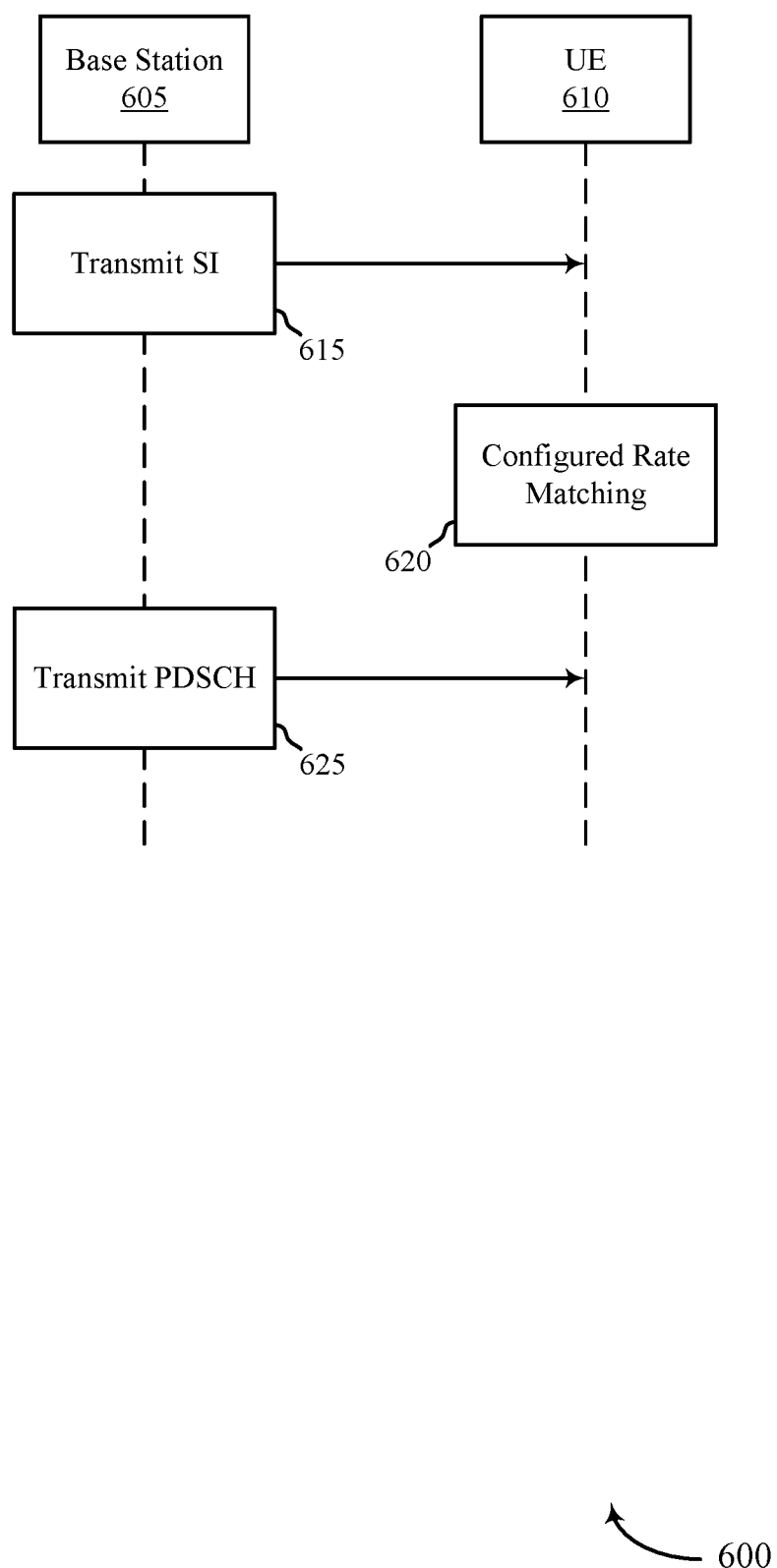
FIG. 6 illustrates an example of a process that supports control search space overlap indication in accordance with aspects of the present disclosure.

FIG. 6 illustrates an example of a process 600 that supports control search space overlap indication in accordance with aspects of the present disclosure. In some examples, process 600 may implement aspects of wireless communication systems 100, 200, and/or SSB configurations 300, 400. Aspects of process 600 may be implemented by a base station 605 and/or UE 610, which may be examples of corresponding devices described herein.

At 615, base station 605 may transmit (and UE 610 may receive) a system information that carries or conveys an indication of a bitmap indicating a subset of SSBs transmitted from a set of SSBs. In some aspects, the system information may also carry or convey an indication of a maximum number of SSBs available for use. In some aspects, the maximum number of SSBs available for use may be greater than a total number of SSBs in the set of SSBs. In some aspects, the system information is conveyed in a previous PDSCH transmission. In some aspects, the system information may refer to a RMSI indicated in the previous PDSCH transmission.

At 620, UE 610 may configure rate matching based at least in part on the subset of SSBs indicated by the bitmap and the indicated maximum number of SSBs available for use. In some aspects, this may include UE 610 repeating a pattern in the bitmap for the subset of SSBs within the set of SSBs as well as for SSBs occurring after the subset of SSBs and within the maximum number of SSBs available for use.

At 625, base station 605 may transmit (and UE 610 may receive) the PDSCH transmission based at least in part on the rate matching. As discussed, this may include the system information being transmitted in a previous PDSCH transmission whereas UE 610 performs the PDSCH transmission with base station 605 by rate matching around SSBs transmitted in subsequent PDSCH transmissions. In some aspects, the PDSCH transmission may be received during a same discovery period (e.g., DRS period) in which the maximum number of SSBs available for use may be transmitted.

Figure 7:
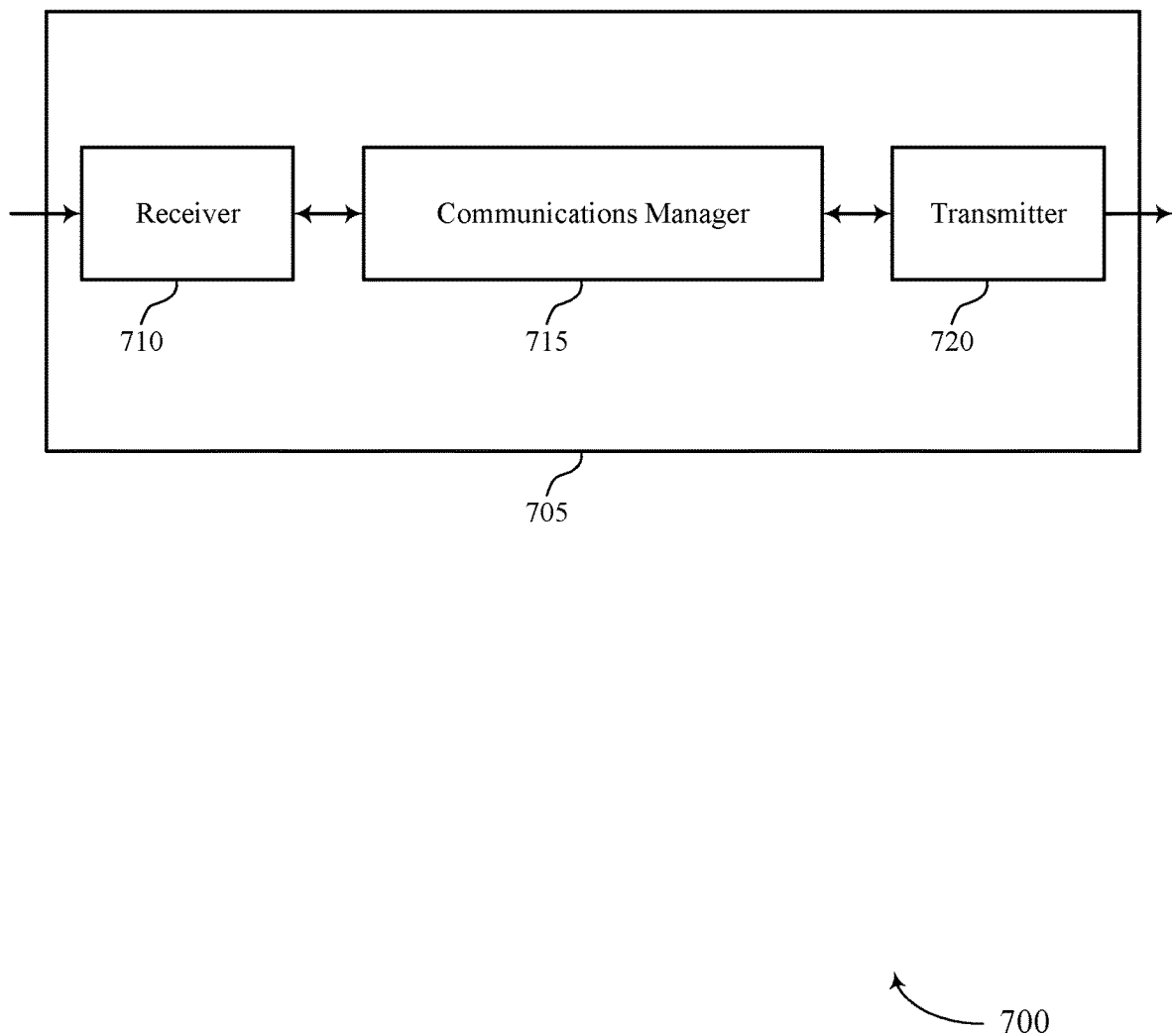
FIGS. 7 and 8 show block diagrams of devices that support control search space overlap indication in accordance with aspects of the present disclosure.

FIG. 7 shows a block diagram 700 of a device 705 that supports control search space overlap indication in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to control search space overlap indication, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a SSB of a set of QCL SSBs, the SSB including an indication of a parameter indicating information associated with a set of downlink control channel locations corresponding to the set of QCL SSBs, determine, based on the parameter, the set of downlink control channel locations corresponding to the set of QCL SSBs, receive a downlink grant for a system information based on monitoring one or more downlink control channel locations of the set of downlink control channel locations, receive the system information based on the downlink grant, and establish a connection with the base station based on the SSB and the received system information. The communications manager 715 may also receive a system information including a bitmap indicating a subset of SSBs transmitted from a set of SSBs, the system information signal further indicating a maximum number of SSBs available for use, where the maximum number of SSBs available for use is greater than a total number of SSBs in the set of SSBs, configure rate matching based on the subset of SSBs indicated by the bitmap and the indicated maximum number of SSBs available for use, and receive a physical downlink shared channel transmission based on the rate matching. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
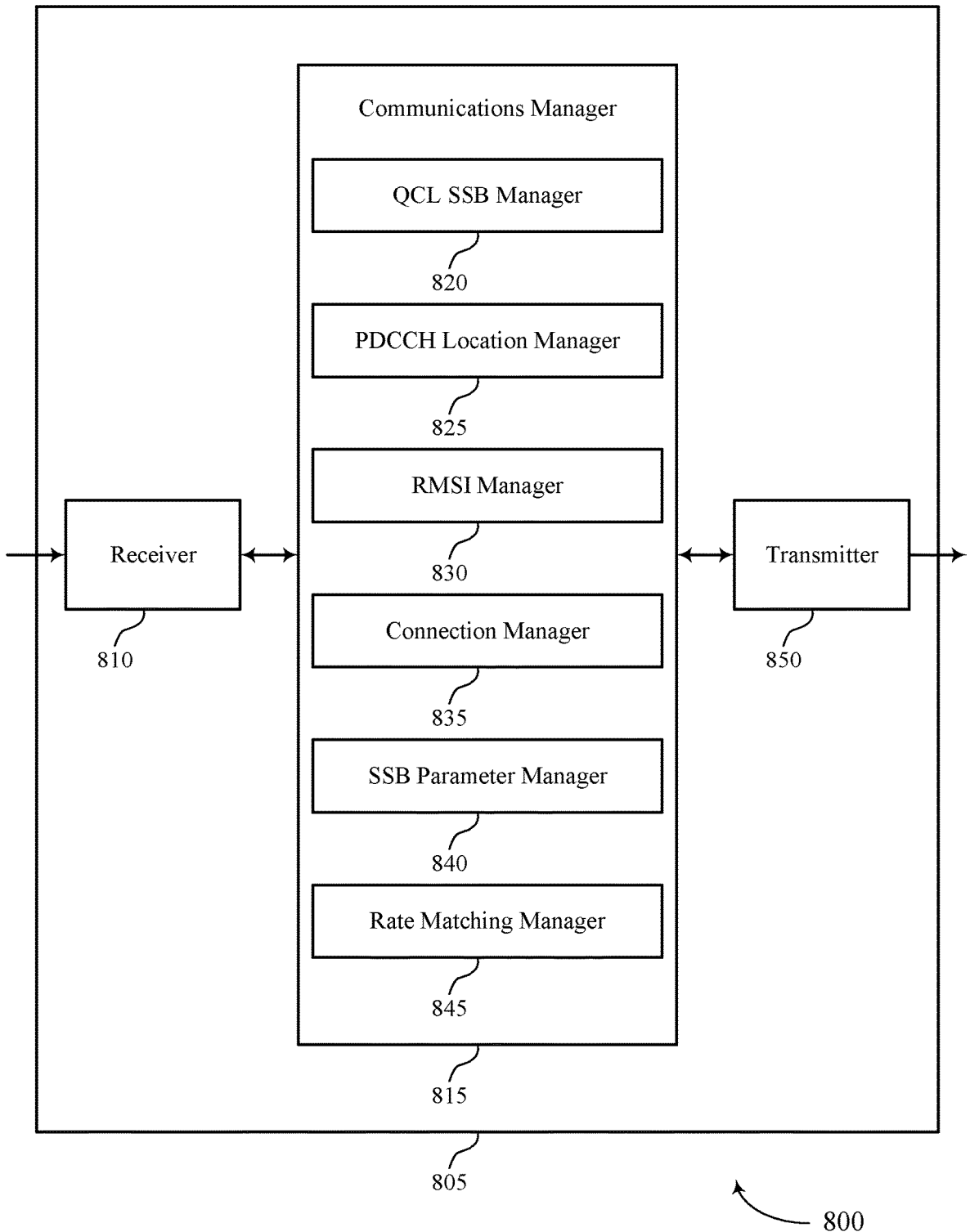

FIG. 8 shows a block diagram 800 of a device 805 that supports control search space overlap indication in accordance with aspects of the present disclosure. The device 805 may be an example of aspects of a device 705, or a UE 115 as described herein. The device 805 may include a receiver 810, a communications manager 815, and a transmitter 850. The device 805 may also include a processor. Each of these components may be in communication with one another (e.g., via one or more buses).

The receiver 810 may receive information such as packets, user data, or control information associated with various information channels (e.g., control channels, data channels, and information related to control search space overlap indication, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a QCL SSB manager 820, a PDCCH location manager 825, a RMSI manager 830, a connection manager 835, a SSB parameter manager 840, and a rate matching manager 845. The communications manager 815 may be an example of aspects of the communications manager 1010 described herein.

The QCL SSB manager 820 may receive, from a base station, a SSB of a set of QCL SSBs, the SSB including an indication of a parameter indicating information associated with a set of downlink control channel locations corresponding to the set of QCL SSBs.

The PDCCH location manager 825 may determine, based on the parameter, the set of downlink control channel locations corresponding to the set of QCL SSBs and receive a downlink grant for a system information based on monitoring one or more downlink control channel locations of the set of downlink control channel locations.

The RMSI manager 830 may receive the system information based on the downlink grant.

The connection manager 835 may establish a connection with the base station based on the SSB and the received system information.

The SSB parameter manager 840 may receive a system information including a bitmap indicating a subset of SSBs transmitted from a set of SSBs, the system information signal further indicating a maximum number of SSBs available for use, where the maximum number of SSBs available for use is greater than a total number of SSBs in the set of SSBs.

The rate matching manager 845 may configure rate matching based on the subset of SSBs indicated by the bitmap and the indicated maximum number of SSBs available for use and receive a physical downlink shared channel transmission based on the rate matching.

The transmitter 850 may transmit signals generated by other components of the device 805. In some examples, the transmitter 850 may be collocated with a receiver 810 in a transceiver module. For example, the transmitter 850 may be an example of aspects of the transceiver 1020 described with reference to FIG. 10. The transmitter 850 may utilize a single antenna or a set of antennas.

Figure 9:
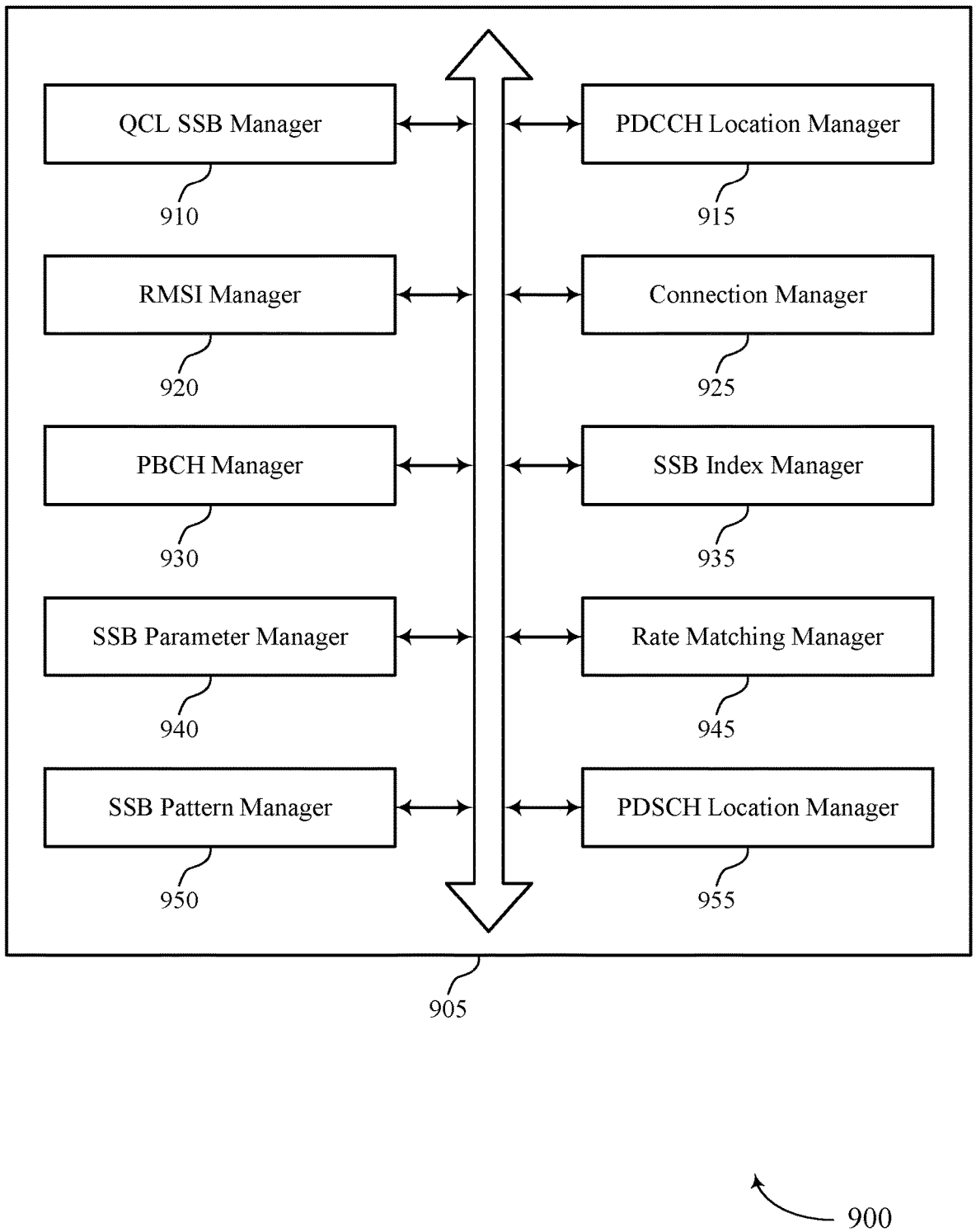
FIG. 9 shows a block diagram of a communications manager that supports control search space overlap indication in accordance with aspects of the present disclosure.

FIG. 9 shows a block diagram 900 of a communications manager 905 that supports control search space overlap indication in accordance with aspects of the present disclosure. The communications manager 905 may be an example of aspects of a communications manager 715, a communications manager 815, or a communications manager 1010 described herein. The communications manager 905 may include a QCL SSB manager 910, a PDCCH location manager 915, a RMSI manager 920, a connection manager 925, a PBCH manager 930, a SSB index manager 935, a SSB parameter manager 940, a rate matching manager 945, a SSB pattern manager 950, and a PDSCH location manager 955. Each of these modules may communicate, directly or indirectly, with one another (e.g., via one or more buses).

The QCL SSB manager 910 may receive, from a base station, a SSB of a set of QCL SSBs, the SSB including an indication of a parameter indicating information associated with a set of downlink control channel locations corresponding to the set of QCL SSBs. In some cases, the parameter includes an indication of offset between successive SSBs within the set of QCL SSBs.

The PDCCH location manager 915 may determine, based on the parameter, the set of downlink control channel locations corresponding to the set of QCL SSBs. In some examples, the PDCCH location manager 915 may receive a downlink grant for a system information based on monitoring one or more downlink control channel locations of the set of downlink control channel locations. In some examples, the PDCCH location manager 915 may determine the set of downlink control channel locations is based on a frame in which the SSB is received and the parameter indicated in the SSB.

In some examples, the PDCCH location manager 915 may monitor each downlink control channel location of the set of downlink control channel locations. In some examples, the PDCCH location manager 915 may determine that no downlink control information was detected during a first instance of the set of downlink control channel locations. In some examples, the PDCCH location manager 915 may monitor, based on the parameter, a second instance of the set of downlink control channel locations to detect the downlink grant. In some cases, the downlink control channel locations of the set of downlink control channel locations include type 0 physical downlink control channel common search spaces.

The RMSI manager 920 may receive the system information based on the downlink grant.

The connection manager 925 may establish a connection with the base station based on the SSB and the received system information.

The SSB parameter manager 940 may receive a system information including a bitmap indicating a subset of SSBs transmitted from a set of SSBs, the system information signal further indicating a maximum number of SSBs available for use, where the maximum number of SSBs available for use is greater than a total number of SSBs in the set of SSBs.

The rate matching manager 945 may configure rate matching based on the subset of SSBs indicated by the bitmap and the indicated maximum number of SSBs available for use.

In some examples, the rate matching manager 945 may receive a physical downlink shared channel transmission based on the rate matching.

The PBCH manager 930 may receive a physical broadcast channel portion of the SSB, the physical broadcast channel portion of the SSB including the indication of the parameter. In some examples, the PBCH manager 930 may perform soft combining across a set of SSBs. In some cases, the indication of the parameter is common across each SSB of the set of SSBs.

The SSB index manager 935 may determine indices of each SSB of the set of QCL SSBs. In some examples, the SSB index manager 935 may where determining the set of downlink control channel locations is based on the determined index of each SSB of the set of QCL SSBs.

The SSB pattern manager 950 may repeat a pattern in the bitmap for the subset of SSBs within the set of SSBs and for SSBs occurring after the subset of SSBs and within the maximum number of SSBs available for use.

The PDSCH location manager 955 may receive a previous physical downlink shared channel transmission including the system information.

In some examples, the PDSCH location manager 955 may decode the system information to identify the bitmap, where rate matching is not performed on the previous physical downlink shared channel. In some cases, the physical downlink shared channel transmission is received during a same discovery period in which the maximum number of SSBs available for use may be transmitted.

Figure 10:
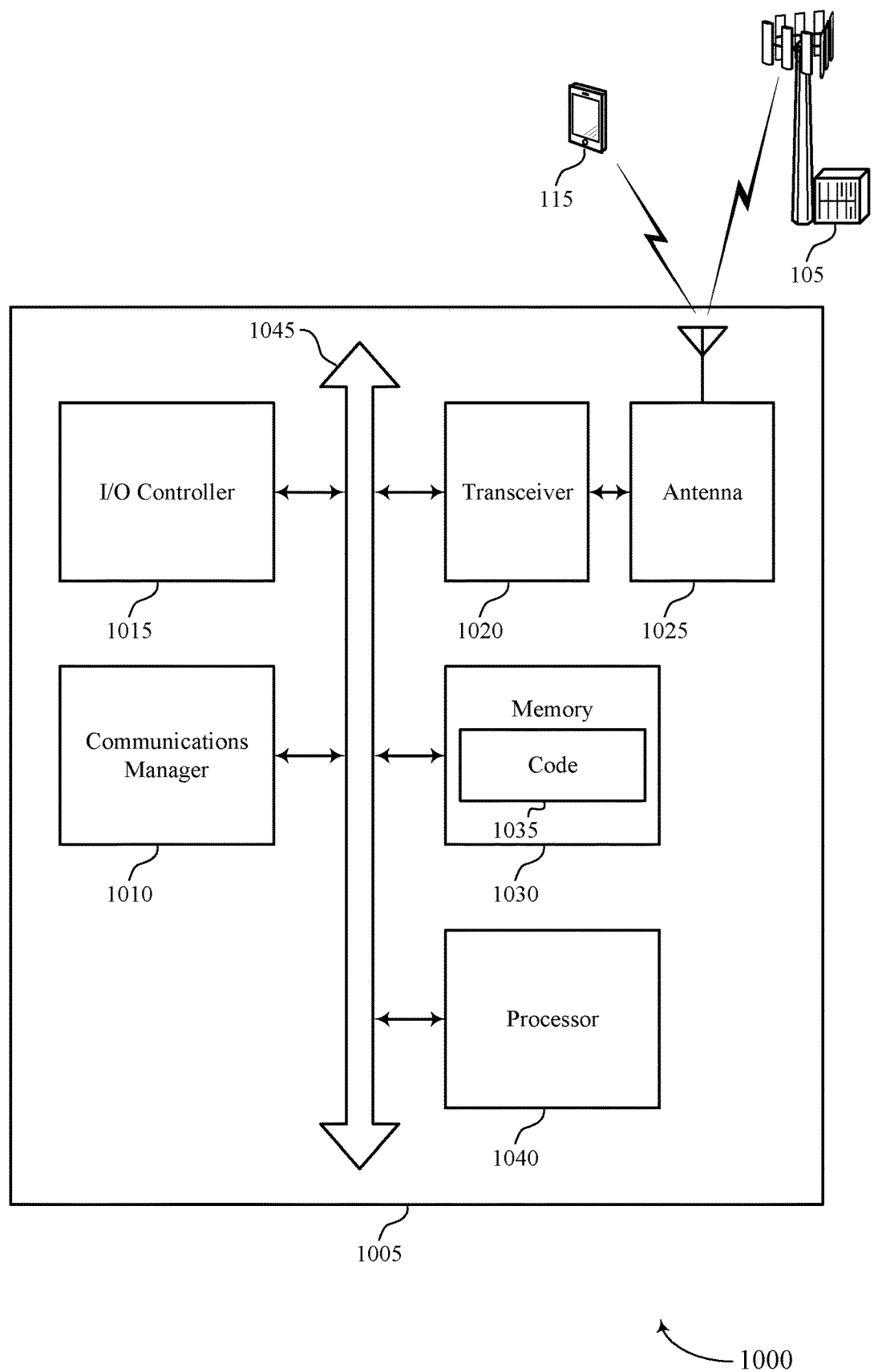
FIG. 10 shows a diagram of a system including a device that supports control search space overlap indication in accordance with aspects of the present disclosure.

FIG. 10 shows a diagram of a system 1000 including a device 1005 that supports control search space overlap indication in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a SSB of a set of QCL SSBs, the SSB including an indication of a parameter indicating information associated with a set of downlink control channel locations corresponding to the set of QCL SSBs, determine, based on the parameter, the set of downlink control channel locations corresponding to the set of QCL SSBs, receive a downlink grant for a system information based on monitoring one or more downlink control channel locations of the set of downlink control channel locations, receive the system information based on the downlink grant, and establish a connection with the base station based on the SSB and the received system information. The communications manager 1010 may also receive a system information including a bitmap indicating a subset of SSBs transmitted from a set of SSBs, the system information signal further indicating a maximum number of SSBs available for use, where the maximum number of SSBs available for use is greater than a total number of SSBs in the set of SSBs, configure rate matching based on the subset of SSBs indicated by the bitmap and the indicated maximum number of SSBs available for use, and receive a physical downlink shared channel transmission based on the rate matching.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting control search space overlap indication).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
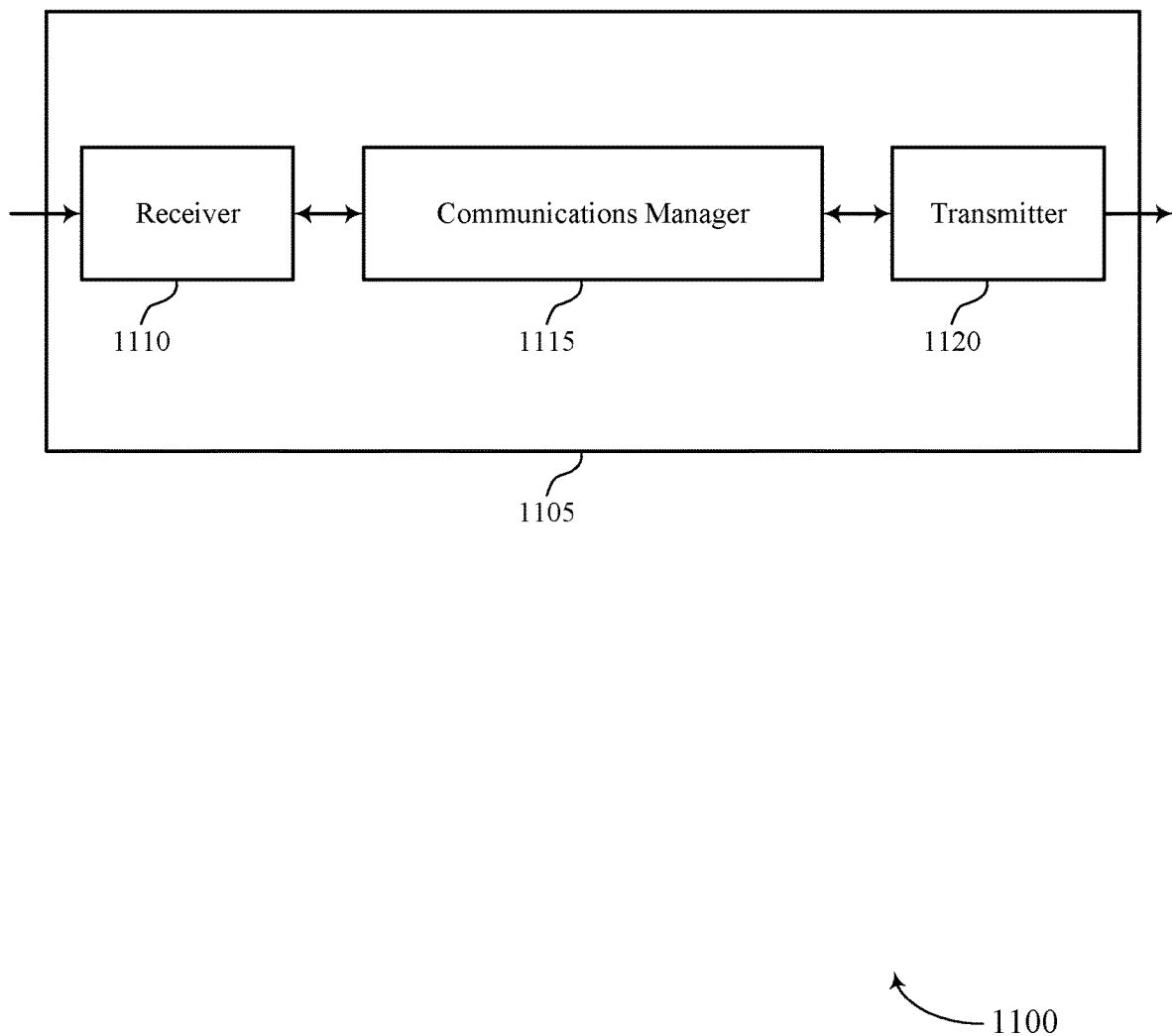
FIGS. 11 and 12 show block diagrams of devices that support control search space overlap indication in accordance with aspects of the present disclosure.

FIG. 11 shows a block diagram 1100 of a device 1105 that supports control search space overlap indication in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to control search space overlap indication, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit a set of SSBs, the set of SSBs including a set of QCL SSBs, where each SSB of the set of SSBs includes an indication of a parameter indicating information associated with a set of downlink control channel locations corresponding to the set of QCL SSBs, transmit, based on the parameter, a downlink grant for a system information over the set of downlink control channel locations corresponding to the set of QCL SSBs, transmit the system information according to the grant, and establish a connection with a UE based on the SSB and the system information. The communications manager 1115 may also transmit a system information including a bitmap indicating a subset of SSBs transmitted from a set of SSBs, the system information further indicating a maximum number of SSBs available for use, where the maximum number of SSBs available for use is greater than a total number of SSBs in the set of SSBs, configure rate matching based on the subset of SSBs indicated by the bitmap and the indicated maximum number of SSBs available for use, and perform a physical downlink shared channel transmission based on the rate matching. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

FIG. 12 shows a block diagram 1200 of a device 1205 that supports control search space overlap indication in accordance with aspects of the present disclosure. The device 1205 may be an example of aspects of a device 1105, or a base station 105 as described herein. The device 1205 may include a receiver 1210, a communications manager 1215, and a transmitter 1250. The device 1205 may also include a processor. Each of these components may be in communication with one another (e.g., via one or more buses).

The receiver 1210 may receive information such as packets, user data, or control information associated with various information channels (e.g., control channels, data channels, and information related to control search space overlap indication, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a QCL SSB manager 1220, a PDCCH location manager 1225, a RMSI manager 1230, a connection manager 1235, a SSB parameter manager 1240, and a rate matching manager 1245. The communications manager 1215 may be an example of aspects of the communications manager 1410 described herein.

The QCL SSB manager 1220 may transmit a set of SSBs, the set of SSBs including a set of QCL SSBs, where each SSB of the set of SSBs includes an indication of a parameter indicating information associated with a set of downlink control channel locations corresponding to the set of QCL SSBs.

The PDCCH location manager 1225 may transmit, based on the parameter, a downlink grant for a system information over the set of downlink control channel locations corresponding to the set of QCL SSBs.

The RMSI manager 1230 may transmit the system information according to the grant.

The connection manager 1235 may establish a connection with a UE based on the SSB and the system information.

The SSB parameter manager 1240 may transmit a system information including a bitmap indicating a subset of SSBs transmitted from a set of SSBs, the system information further indicating a maximum number of SSBs available for use, where the maximum number of SSBs available for use is greater than a total number of SSBs in the set of SSBs.

The rate matching manager 1245 may configure rate matching based on the subset of SSBs indicated by the bitmap and the indicated maximum number of SSBs available for use and perform a physical downlink shared channel transmission based on the rate matching.

The transmitter 1250 may transmit signals generated by other components of the device 1205. In some examples, the transmitter 1250 may be collocated with a receiver 1210 in a transceiver module. For example, the transmitter 1250 may be an example of aspects of the transceiver 1420 described with reference to FIG. 14. The transmitter 1250 may utilize a single antenna or a set of antennas.

Figure 13:
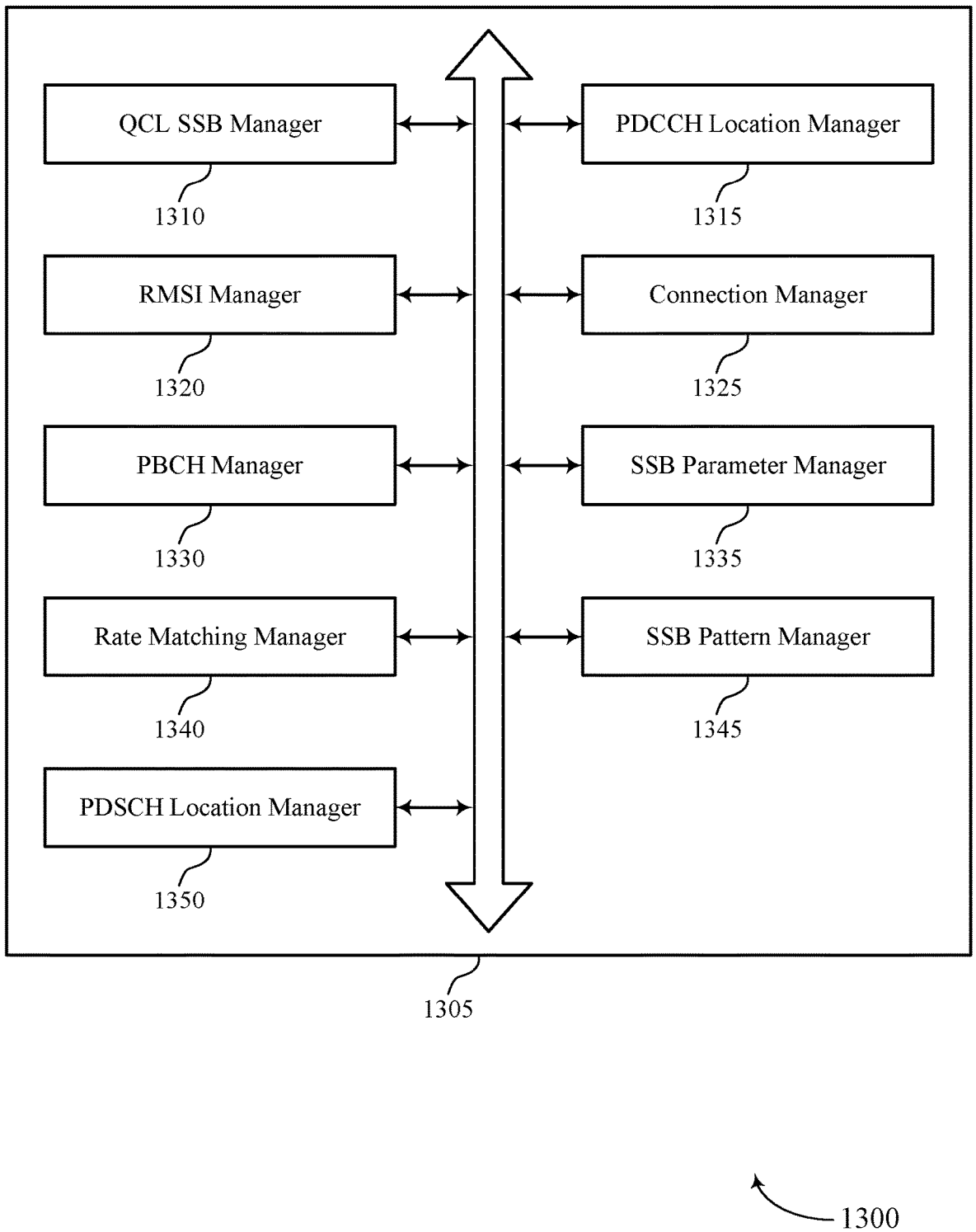
FIG. 13 shows a block diagram of a communications manager that supports control search space overlap indication in accordance with aspects of the present disclosure.

FIG. 13 shows a block diagram 1300 of a communications manager 1305 that supports control search space overlap indication in accordance with aspects of the present disclosure. The communications manager 1305 may be an example of aspects of a communications manager 1115, a communications manager 1215, or a communications manager 1410 described herein. The communications manager 1305 may include a QCL SSB manager 1310, a PDCCH location manager 1315, a RMSI manager 1320, a connection manager 1325, a PBCH manager 1330, a SSB parameter manager 1335, a rate matching manager 1340, a SSB pattern manager 1345, and a PDSCH location manager 1350. Each of these modules may communicate, directly or indirectly, with one another (e.g., via one or more buses).

The QCL SSB manager 1310 may transmit a set of SSBs, the set of SSBs including a set of QCL SSBs, where each SSB of the set of SSBs includes an indication of a parameter indicating information associated with a set of downlink control channel locations corresponding to the set of QCL SSBs. In some cases, the parameter includes an indication of an offset between successive SSBs within the set of QCL SSBs.

The PDCCH location manager 1315 may transmit, based on the parameter, a downlink grant for a system information over the set of downlink control channel locations corresponding to the set of QCL SSBs.

The RMSI manager 1320 may transmit the system information according to the grant.

The connection manager 1325 may establish a connection with a UE based on the SSB and the system information.

The SSB parameter manager 1335 may transmit a system information including a bitmap indicating a subset of SSBs transmitted from a set of SSBs, the system information further indicating a maximum number of SSBs available for use, where the maximum number of SSBs available for use is greater than a total number of SSBs in the set of SSBs.

The rate matching manager 1340 may configure rate matching based on the subset of SSBs indicated by the bitmap and the indicated maximum number of SSBs available for use. In some examples, the rate matching manager 1340 may perform a physical downlink shared channel transmission based on the rate matching.

The PBCH manager 1330 may transmit a physical broadcast channel portion of the SSB, the physical broadcast portion of the SSB including the indication of the parameter. In some cases, the indication of the parameter is common across each SSB of the set of SSBs.

The SSB pattern manager 1345 may repeat a pattern in the bitmap for transmitting the subset of SSBs within the set of SSBs and for a set of additional SSBs transmitted after the subset of SSBs and within the maximum number of SSBs available for use.

The PDSCH location manager 1350 may perform a previous physical downlink shared channel transmission including the system information.

Figure 14:
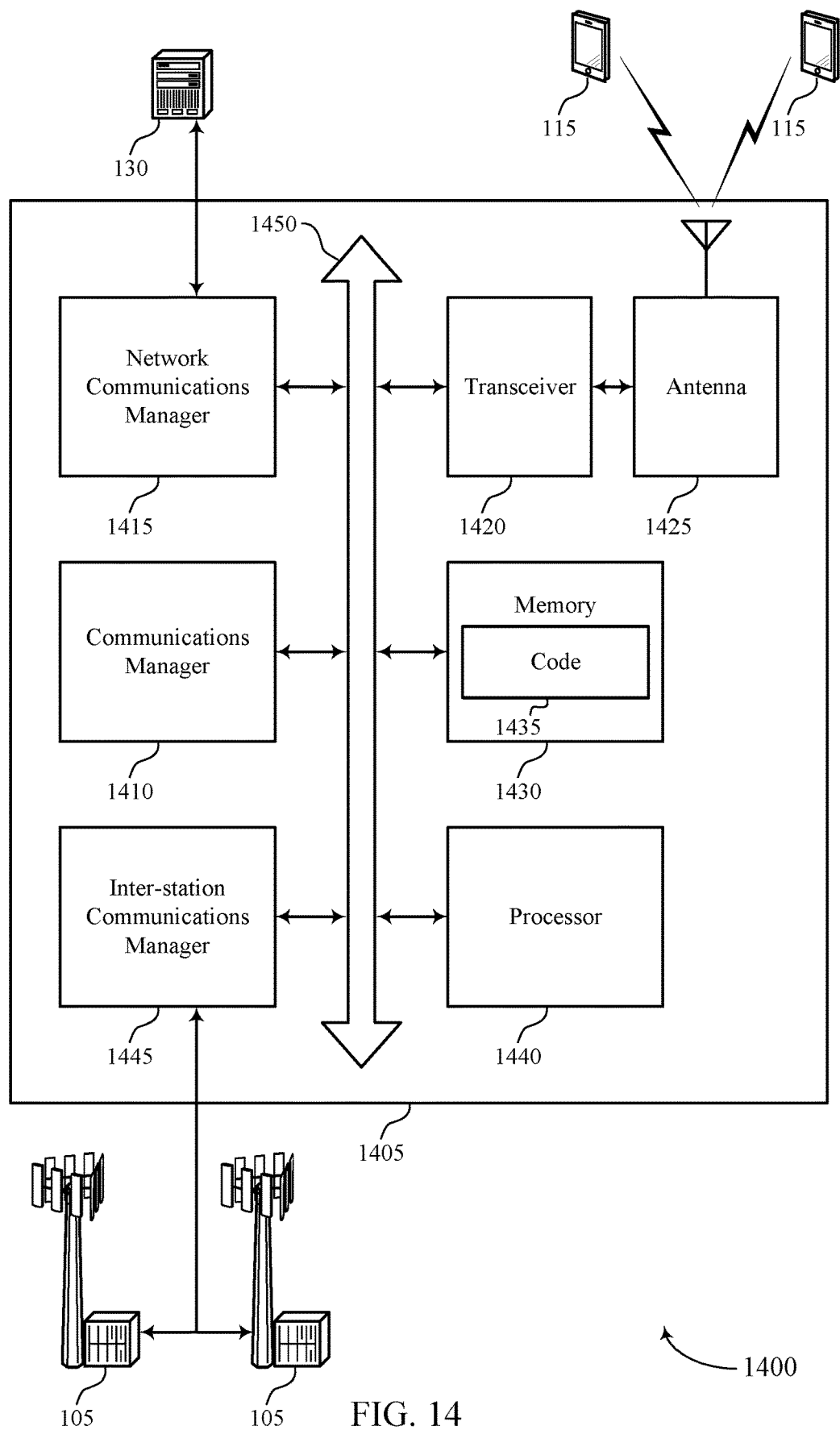
FIG. 14 shows a diagram of a system including a device that supports control search space overlap indication in accordance with aspects of the present disclosure.

FIG. 14 shows a diagram of a system 1400 including a device 1405 that supports control search space overlap indication in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit a set of SSBs, the set of SSBs including a set of QCL SSBs, where each SSB of the set of SSBs includes an indication of a parameter indicating information associated with a set of downlink control channel locations corresponding to the set of QCL SSBs, transmit, based on the parameter, a downlink grant for a system information over the set of downlink control channel locations corresponding to the set of QCL SSBs, transmit the system information according to the grant, and establish a connection with a UE based on the SSB and the system information. The communications manager 1410 may also transmit a system information including a bitmap indicating a subset of SSBs transmitted from a set of SSBs, the system information further indicating a maximum number of SSBs available for use, where the maximum number of SSBs available for use is greater than a total number of SSBs in the set of SSBs, configure rate matching based on the subset of SSBs indicated by the bitmap and the indicated maximum number of SSBs available for use, and perform a physical downlink shared channel transmission based on the rate matching.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting control search space overlap indication).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
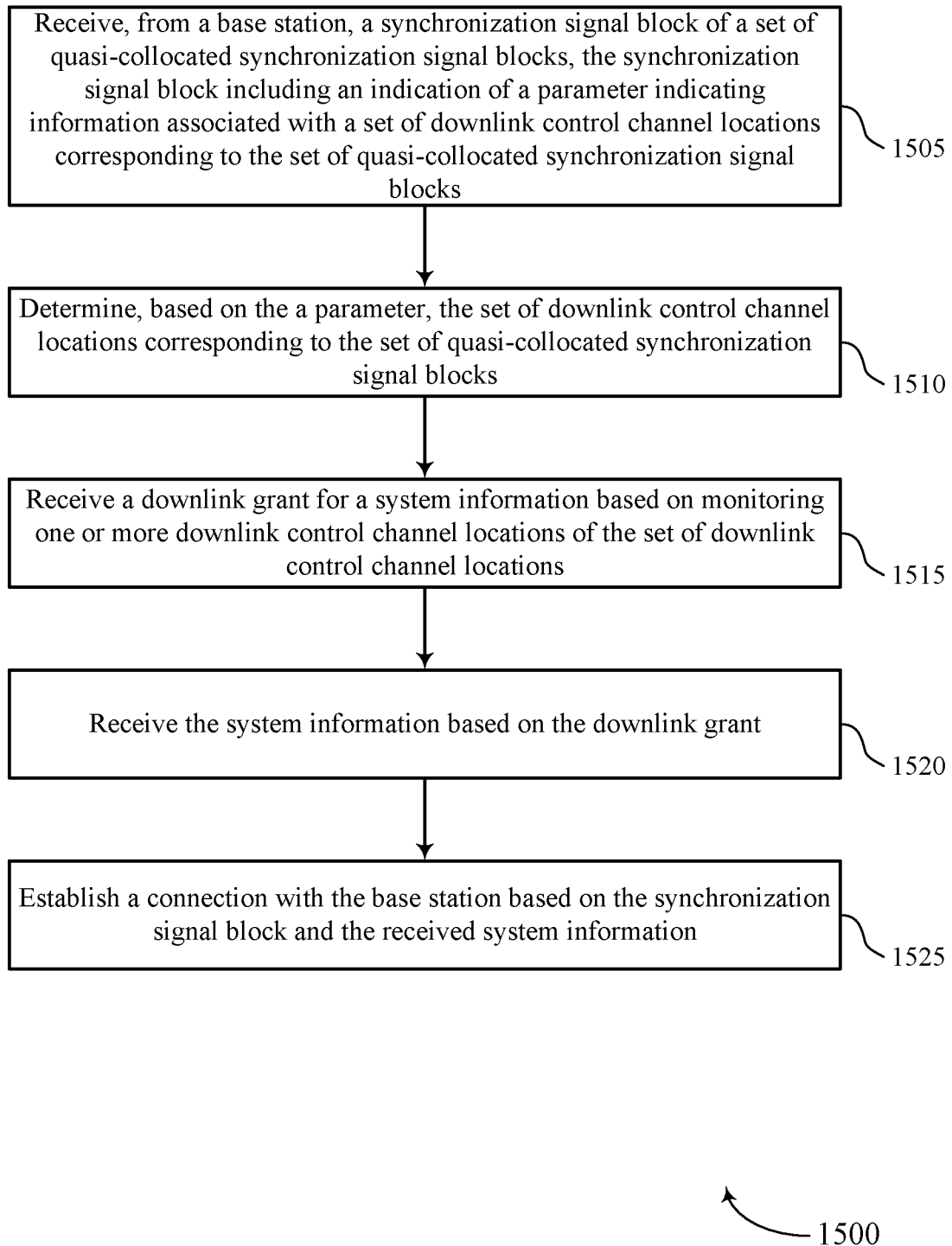
FIGS. 15 through 18 show flowcharts illustrating methods that support control search space overlap indication in accordance with aspects of the present disclosure.

FIG. 15 shows a flowchart illustrating a method 1500 that supports control search space overlap indication in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a SSB of a set of QCL SSBs, the SSB including an indication of a parameter indicating information associated with a set of downlink control channel locations corresponding to the set of QCL SSBs. The operations of 1505 may be performed according to the methods described herein. In some examples, aspects of the operations of 1505 may be performed by a QCL SSB manager as described with reference to FIGS. 7 through 10.

At 1510, the UE may determine, based on the parameter, the set of downlink control channel locations corresponding to the set of QCL SSBs. The operations of 1510 may be performed according to the methods described herein. In some examples, aspects of the operations of 1510 may be performed by a PDCCH location manager as described with reference to FIGS. 7 through 10.

At 1515, the UE may receive a downlink grant for a system information based on monitoring one or more downlink control channel locations of the set of downlink control channel locations. The operations of 1515 may be performed according to the methods described herein. In some examples, aspects of the operations of 1515 may be performed by a PDCCH location manager as described with reference to FIGS. 7 through 10.

At 1520, the UE may receive the system information based on the downlink grant. The operations of 1520 may be performed according to the methods described herein. In some examples, aspects of the operations of 1520 may be performed by a RMSI manager as described with reference to FIGS. 7 through 10.

At 1525, the UE may establish a connection with the base station based on the SSB and the received system information. The operations of 1525 may be performed according to the methods described herein. In some examples, aspects of the operations of 1525 may be performed by a connection manager as described with reference to FIGS. 7 through 10.

Figure 16:
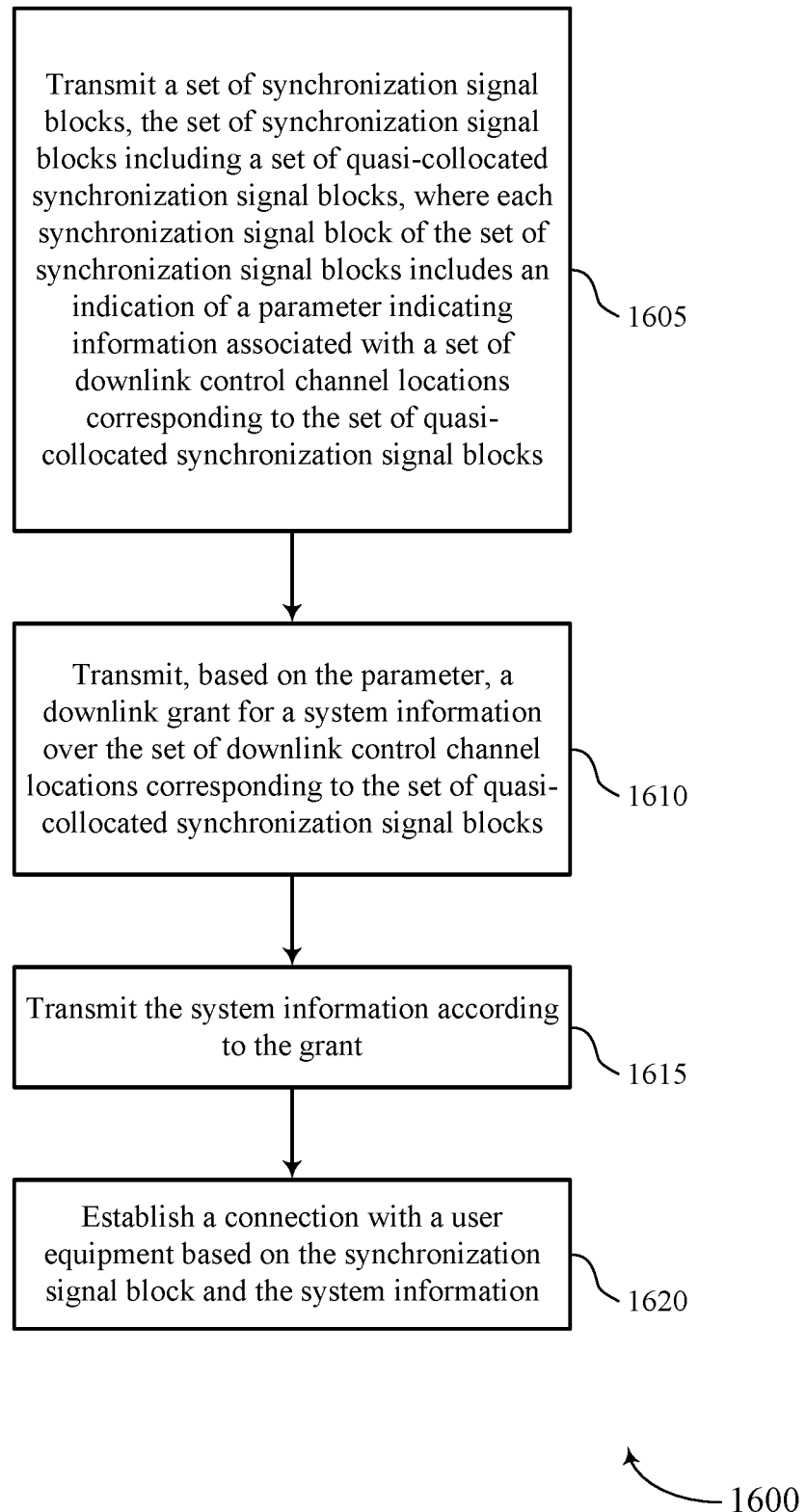

FIG. 16 shows a flowchart illustrating a method 1600 that supports control search space overlap indication in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1605, the base station may transmit a set of SSBs, the set of SSBs including a set of QCL SSBs, where each SSB of the set of SSBs includes an indication of a parameter indicating information associated with a set of downlink control channel locations corresponding to the set of QCL SSBs. The operations of 1605 may be performed according to the methods described herein. In some examples, aspects of the operations of 1605 may be performed by a QCL SSB manager as described with reference to FIGS. 11 through 14.

At 1610, the base station may transmit, based on the parameter, a downlink grant for a system information over the set of downlink control channel locations corresponding to the set of QCL SSBs. The operations of 1610 may be performed according to the methods described herein. In some examples, aspects of the operations of 1610 may be performed by a PDCCH location manager as described with reference to FIGS. 11 through 14.

At 1615, the base station may transmit the system information according to the grant. The operations of 1615 may be performed according to the methods described herein. In some examples, aspects of the operations of 1615 may be performed by a RMSI manager as described with reference to FIGS. 11 through 14.

At 1620, the base station may establish a connection with a UE based on the SSB and the system information. The operations of 1620 may be performed according to the methods described herein. In some examples, aspects of the operations of 1620 may be performed by a connection manager as described with reference to FIGS. 11 through 14.

Figure 17:
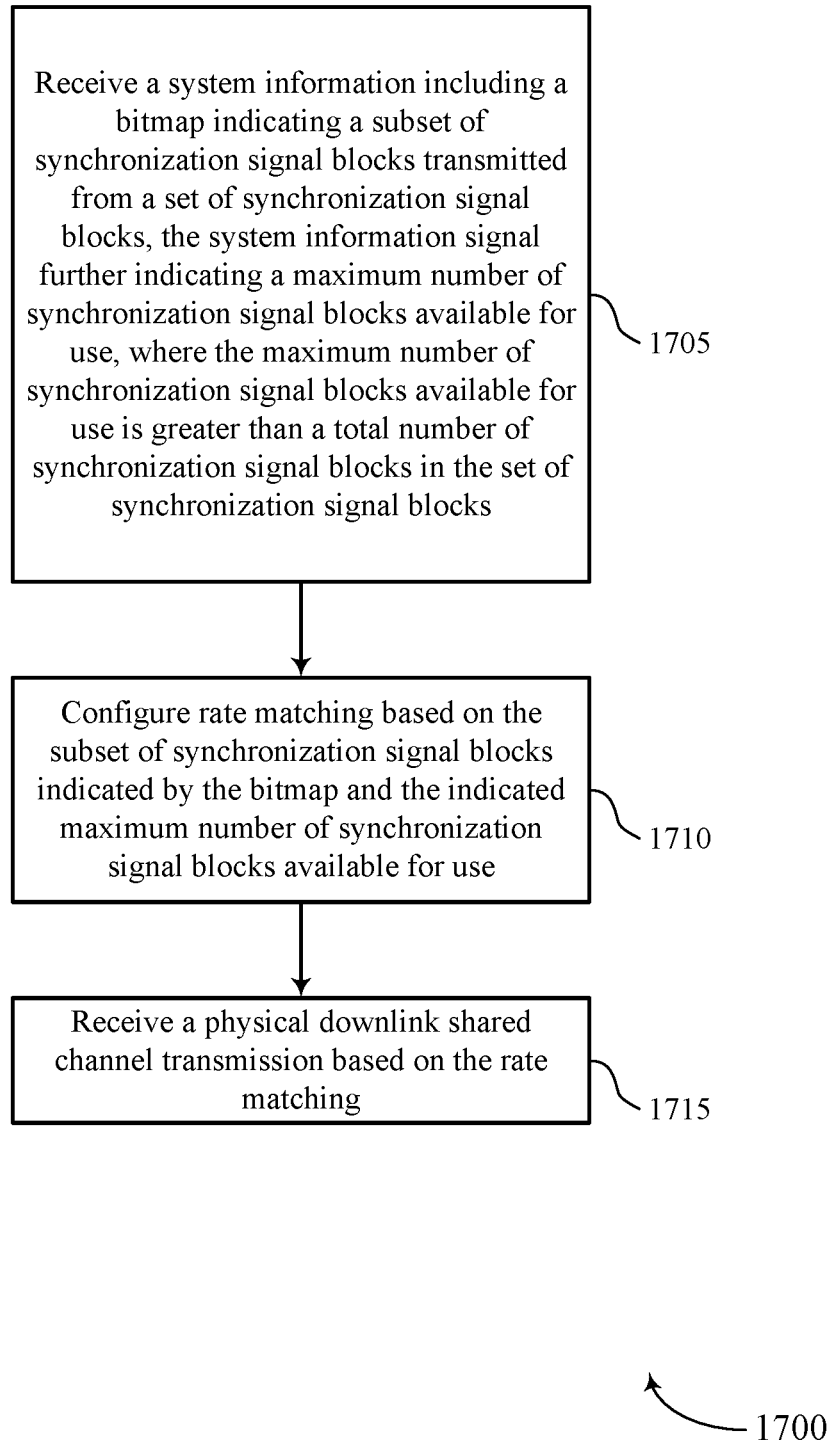

FIG. 17 shows a flowchart illustrating a method 1700 that supports control search space overlap indication in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a system information including a bitmap indicating a subset of SSBs transmitted from a set of SSBs, the system information signal further indicating a maximum number of SSBs available for use, where the maximum number of SSBs available for use is greater than a total number of SSBs in the set of SSBs. The operations of 1705 may be performed according to the methods described herein. In some examples, aspects of the operations of 1705 may be performed by a SSB parameter manager as described with reference to FIGS. 7 through 10.

At 1710, the UE may configure rate matching based on the subset of SSBs indicated by the bitmap and the indicated maximum number of SSBs available for use. The operations of 1710 may be performed according to the methods described herein. In some examples, aspects of the operations of 1710 may be performed by a rate matching manager as described with reference to FIGS. 7 through 10.

At 1715, the UE may receive a physical downlink shared channel transmission based on the rate matching. The operations of 1715 may be performed according to the methods described herein. In some examples, aspects of the operations of 1715 may be performed by a rate matching manager as described with reference to FIGS. 7 through 10.

Figure 18:
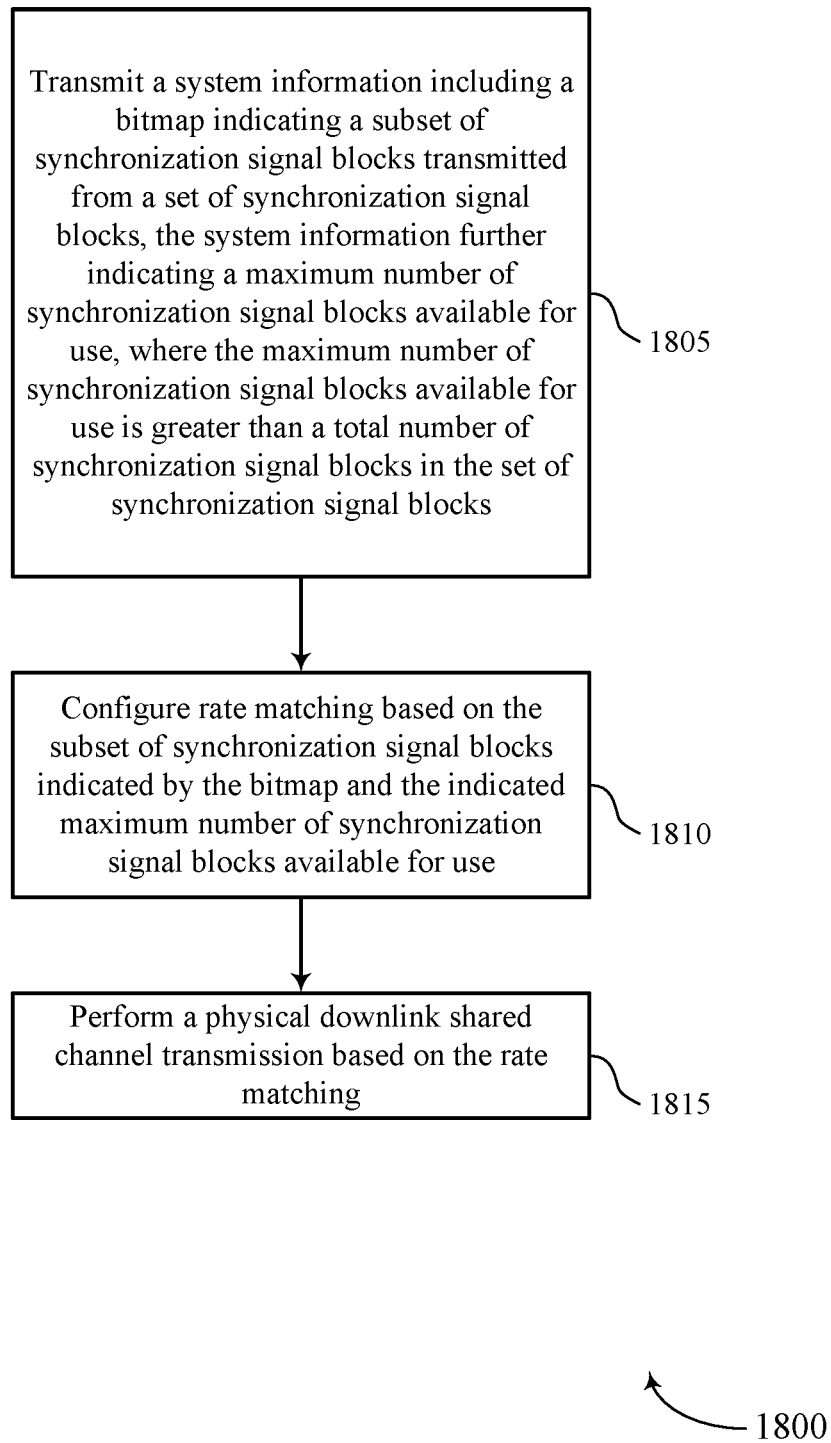

FIG. 18 shows a flowchart illustrating a method 1800 that supports control search space overlap indication in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit a system information including a bitmap indicating a subset of SSBs transmitted from a set of SSBs, the system information further indicating a maximum number of SSBs available for use, where the maximum number of SSBs available for use is greater than a total number of SSBs in the set of SSBs. The operations of 1805 may be performed according to the methods described herein. In some examples, aspects of the operations of 1805 may be performed by a SSB parameter manager as described with reference to FIGS. 11 through 14.

At 1810, the base station may configure rate matching based on the subset of SSBs indicated by the bitmap and the indicated maximum number of SSBs available for use. The operations of 1810 may be performed according to the methods described herein. In some examples, aspects of the operations of 1810 may be performed by a rate matching manager as described with reference to FIGS. 11 through 14.

At 1815, the base station may perform a physical downlink shared channel transmission based on the rate matching. The operations of 1815 may be performed according to the methods described herein. In some examples, aspects of the operations of 1815 may be performed by a rate matching manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a synchronization signal block of a set of quasi-collocated synchronization signal blocks, the synchronization signal block comprising an indication of a parameter indicating information associated with a plurality of downlink control channel locations corresponding to the set of quasi-collocated synchronization signal blocks;
   determining, based at least in part on the parameter, the plurality of downlink control channel locations corresponding to the set of quasi-collocated synchronization signal blocks;
   receiving a downlink grant for a system information based at least in part on monitoring one or more downlink control channel locations of the plurality of downlink control channel locations;
   receiving the system information based at least in part on the downlink grant; and establishing a connection with the base station based at least in part on the synchronization signal block and the received system information.

2. The method of claim 1, wherein the parameter comprises an indication of offset between successive synchronization signal blocks within the set of quasi-collocated synchronization signal blocks.

3. The method of claim 1, wherein receiving the synchronization signal block comprises:
   receiving a physical broadcast channel portion of the synchronization signal block, the physical broadcast channel portion of the synchronization signal block comprising the indication of the parameter.

4. The method of claim 3, wherein receiving the physical broadcast channel portion of the synchronization block comprises:
   performing soft combining across a plurality of synchronization signal blocks.

5. The method of claim 4, wherein the indication of the parameter is common across each synchronization signal block of the plurality of synchronization signal blocks.

6. The method of claim 5, wherein the plurality of synchronization signal blocks comprise at least one of the set of quasi-collocated synchronization signal blocks, a plurality of different sets of quasi-collocated synchronization signal blocks, each synchronization signal block associated with the base station, or a combination thereof.

7. The method of claim 1, wherein:
   determining the plurality of downlink control channel locations is based at least in part on a frame in which the synchronization signal block is received and the parameter indicated in the synchronization signal block.

8. The method of claim 1, wherein receiving the downlink grant comprises:
   monitoring each downlink control channel location of the plurality of downlink control channel locations.

9. The method of claim 1, wherein receiving the downlink grant comprises:
   determining that no downlink control information was detected during a first instance of the plurality of downlink control channel locations; and
   monitoring, based at least in part on the parameter, a second instance of the plurality of downlink control channel locations to detect the downlink grant.

10. The method of claim 1, wherein the downlink control channel locations of the plurality of downlink control channel locations comprise type 0 physical downlink control channel common search spaces.

11. The method of claim 1, further comprising:
    determining indices of each synchronization signal block of the set of quasi-collocated synchronization signal blocks,
    wherein determining the plurality of downlink control channel locations is based at least in part on the determined index of each synchronization signal block of the set of quasi-collocated synchronization signal blocks.

12. A method for wireless communication at a base station, comprising:
    transmitting a plurality of synchronization signal blocks, the plurality of synchronization signal blocks comprising a set of quasi-collocated synchronization signal blocks, wherein each synchronization signal block of the plurality of synchronization signal blocks comprises an indication of a parameter indicating information associated with a plurality of downlink control channel locations corresponding to the set of quasi-collocated synchronization signal blocks;
    transmitting, based at least in part on the parameter, a downlink grant for a system information over the plurality of downlink control channel locations corresponding to the set of quasi-collocated synchronization signal blocks;
    transmitting the system information according to the grant; and
    establishing a connection with a user equipment based at least in part on the synchronization signal block and the system information.

13. The method of claim 12, wherein the parameter comprises an indication of an offset between successive synchronization signal blocks within the set of quasi-collocated synchronization signal blocks.

14. The method of claim 12, wherein transmitting the plurality of synchronization signal blocks comprises:
   transmitting a physical broadcast channel portion of the synchronization signal block, the physical broadcast portion of the synchronization signal block comprising the indication of the parameter.

15. The method of claim 14, wherein the indication of the parameter is common across each synchronization signal block of the plurality of synchronization signal blocks.

16. A method for wireless communication at a user equipment (UE), comprising:
   receiving a system information comprising a bitmap indicating a subset of synchronization signal blocks transmitted from a set of synchronization signal blocks, the system information signal further indicating a maximum number of synchronization signal blocks available for use, wherein the maximum number of synchronization signal blocks available for use is greater than a total number of synchronization signal blocks in the set of synchronization signal blocks;
   configuring rate matching based at least in part on the subset of synchronization signal blocks indicated by the bitmap and the indicated maximum number of synchronization signal blocks available for use; and
   receiving a physical downlink shared channel transmission based at least in part on the rate matching.

17. The method of claim 16, wherein configuring rate matching comprises:
   repeating a pattern in the bitmap for the subset of synchronization signal blocks within the set of synchronization signal blocks and for synchronization signal blocks occurring after the subset of synchronization signal blocks and within the maximum number of synchronization signal blocks available for use.

18. The method of claim 16, wherein receiving the system information comprises:
   receiving a previous physical downlink shared channel transmission comprising the system information; and
   decoding the system information to identify the bitmap, wherein rate matching is not performed on the previous physical downlink shared channel.

19. The method of claim 16, wherein the physical downlink shared channel transmission is received during a same discovery period in which the maximum number of synchronization signal blocks available for use may be transmitted.

20. A method for wireless communication at a base station, comprising:
   transmitting a system information comprising a bitmap indicating a subset of synchronization signal blocks transmitted from a set of synchronization signal blocks, the system information further indicating a maximum number of synchronization signal blocks available for use, wherein the maximum number of synchronization signal blocks available for use is greater than a total number of synchronization signal blocks in the set of synchronization signal blocks;
   configuring rate matching based at least in part on the subset of synchronization signal blocks indicated by the bitmap and the indicated maximum number of synchronization signal blocks available for use; and
   performing a physical downlink shared channel transmission based at least in part on the rate matching.

21. The method of claim 20, further comprising:
   repeating a pattern in the bitmap for transmitting the subset of synchronization signal blocks within the set of synchronization signal blocks and for a plurality of additional synchronization signal blocks transmitted after the subset of synchronization signal blocks and within the maximum number of synchronization signal blocks available for use.

22. The method of claim 20, wherein transmitting the system information comprises:
   performing a previous physical downlink shared channel transmission comprising the system information.

23. An apparatus for wireless communication at a user equipment (UE), comprising:
   a processor,
   memory in electronic communication with the processor; and
   instructions stored in the memory and executable by the processor to cause the apparatus to:
   receive, from a base station, a synchronization signal block of a set of quasi-collocated synchronization signal blocks, the synchronization signal block comprising an indication of a parameter indicating information associated with a plurality of downlink control channel locations corresponding to the set of quasi-collocated synchronization signal blocks;
   determine, based at least in part on the parameter, the plurality of downlink control channel locations corresponding to the set of quasi-collocated synchronization signal blocks;
   receive a downlink grant for a system information based at least in part on monitoring one or more downlink control channel locations of the plurality of downlink control channel locations;
   receive the system information based at least in part on the downlink grant; and
   establish a connection with the base station based at least in part on the synchronization signal block and the received system information.

24. The apparatus of claim 23, wherein the parameter comprises an indication of offset between successive synchronization signal blocks within the set of quasi-collocated synchronization signal blocks.

25. The apparatus of claim 23, wherein the instructions to receive the synchronization signal block are executable by the processor to cause the apparatus to:
   receive a physical broadcast channel portion of the synchronization signal block, the physical broadcast channel portion of the synchronization signal block comprising the indication of the parameter.

26. The apparatus of claim 25, wherein the instructions to receive the physical broadcast channel portion of the synchronization block are executable by the processor to cause the apparatus to:
   perform soft combining across a plurality of synchronization signal blocks.

27. The apparatus of claim 26, wherein the indication of the parameter is common across each synchronization signal block of the plurality of synchronization signal blocks.

28. The apparatus of claim 23, wherein the instructions are further executable by the processor to cause the apparatus to:
   determine indices of each synchronization signal block of the set of quasi-collocated synchronization signal blocks,
   wherein determining the plurality of downlink control channel locations is based at least in part on the determined index of each synchronization signal block of the set of quasi-collocated synchronization signal blocks.

29. The apparatus of claim 23, wherein determining the plurality of downlink control channel locations is based at least in part on a frame in which the synchronization signal block is received and the parameter indicated in the synchronization signal block.

30. The apparatus of claim 23, wherein the instructions to receive the downlink grant are executable by the processor to cause the apparatus to:
monitor each downlink control channel location of the plurality of downlink control channel locations.

31. The apparatus of claim 23, wherein the instructions to receive the downlink grant are executable by the processor to cause the apparatus to:
determine that no downlink control information was detected during a first instance of the plurality of downlink control channel locations; and
monitor, based at least in part on the parameter, a second instance of the plurality of downlink control channel locations to detect the downlink grant.

32. The apparatus of claim 23, wherein the downlink control channel locations of the plurality of downlink control channel locations comprise type 0 physical downlink control channel common search spaces.

33. An apparatus for wireless communication at a base station, comprising:
a processor,
memory in electronic communication with the processor; and
instructions stored in the memory and executable by the processor to cause the apparatus to:
transmit a plurality of synchronization signal blocks, the plurality of synchronization signal blocks comprising a set of quasi-collocated synchronization signal blocks, wherein each synchronization signal block of the plurality of synchronization signal blocks comprises an indication of a parameter indicating information associated with a plurality of downlink control channel locations corresponding to the set of quasi-collocated synchronization signal blocks;
transmit, based at least in part on the parameter, a downlink grant for a system information over the plurality of downlink control channel locations corresponding to the set of quasi-collocated synchronization signal blocks;
transmit the system information according to the grant; and
establish a connection with a user equipment based at least in part on the synchronization signal block and the system information.

34. The apparatus of claim 33, wherein the parameter comprises an indication of an offset between successive synchronization signal blocks within the set of quasi-collocated synchronization signal blocks.

35. The apparatus of claim 33, wherein the instructions to transmit the plurality of synchronization signal blocks are executable by the processor to cause the apparatus to:
transmit a physical broadcast channel portion of the synchronization signal block, the physical broadcast portion of the synchronization signal block comprising the indication of the parameter.

36. The apparatus of claim 35, wherein the indication of the parameter is common across each synchronization signal block of the plurality of synchronization signal blocks.

37. An apparatus for wireless communication at a user equipment (UE), comprising:
a processor,
memory in electronic communication with the processor; and
instructions stored in the memory and executable by the processor to cause the apparatus to:
receive a system information comprising a bitmap indicating a subset of synchronization signal blocks transmitted from a set of synchronization signal blocks, the system information signal further indicating a maximum number of synchronization signal blocks available for use, wherein the maximum number of synchronization signal blocks available for use is greater than a total number of synchronization signal blocks in the set of synchronization signal blocks;
configure rate matching based at least in part on the subset of synchronization signal blocks indicated by the bitmap and the indicated maximum number of synchronization signal blocks available for use; and
receive a physical downlink shared channel transmission based at least in part on the rate matching.

38. The apparatus of claim 37, wherein the instructions to configure rate matching are executable by the processor to cause the apparatus to:
repeat a pattern in the bitmap for the subset of synchronization signal blocks within the set of synchronization signal blocks and for synchronization signal blocks occurring after the subset of synchronization signal blocks and within the maximum number of synchronization signal blocks available for use.

39. The apparatus of claim 37, wherein the instructions to receive the system information are executable by the processor to cause the apparatus to:
receive a previous physical downlink shared channel transmission comprising the system information; and
decode the system information to identify the bitmap, wherein rate matching is not performed on the previous physical downlink shared channel.

40. The apparatus of claim 37, wherein the physical downlink shared channel transmission is received during a same discovery period in which the maximum number of synchronization signal blocks available for use may be transmitted.

41. An apparatus for wireless communication at a base station, comprising:
a processor,
memory in electronic communication with the processor; and
instructions stored in the memory and executable by the processor to cause the apparatus to:
transmit a system information comprising a bitmap indicating a subset of synchronization signal blocks transmitted from a set of synchronization signal blocks, the system information further indicating a maximum number of synchronization signal blocks available for use, wherein the maximum number of synchronization signal blocks available for use is greater than a total number of synchronization signal blocks in the set of synchronization signal blocks;
configure rate matching based at least in part on the subset of synchronization signal blocks indicated by the bitmap and the indicated maximum number of synchronization signal blocks available for use; and
perform a physical downlink shared channel transmission based at least in part on the rate matching.

42. The apparatus of claim 41, wherein the instructions are further executable by the processor to cause the apparatus to:
    repeat a pattern in the bitmap for transmitting the subset of synchronization signal blocks within the set of synchronization signal blocks and for a plurality of additional synchronization signal blocks transmitted after the subset of synchronization signal blocks and within the maximum number of synchronization signal blocks available for use.

43. The apparatus of claim 41, wherein the instructions to transmit the system information are executable by the processor to cause the apparatus to:
    perform a previous physical downlink shared channel transmission comprising the system information.

\* \* \* \* \*